(12) United States Patent
Bournas et al.

(10) Patent No.: US 7,231,267 B2
(45) Date of Patent: Jun. 12, 2007

(54) IMPLEMENTING PRODUCTION PROCESSES

(75) Inventors: Redha M. Bournas, Chapel Hill, NC (US); David Noller, Blacksburg, VA (US); Paul D. Peters, Woodbury, CT (US); David J. Salkeld, Raleigh, NC (US); Shishir Saxena, Ghaziabad (IN)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 11/179,996

(22) Filed: Jul. 12, 2005

(65) Prior Publication Data

US 2007/0016429 A1     Jan. 18, 2007

(51) Int. Cl.
G06F 15/00 (2006.01)
G05B 15/00 (2006.01)
G06F 19/00 (2006.01)

(52) U.S. Cl. ............................ 700/91; 700/51; 700/83; 700/49; 700/104; 707/100; 707/101; 707/102; 707/200; 706/19; 706/20; 715/500; 715/514

(58) Field of Classification Search .................... 700/1, 700/83, 91, 104, 49, 51, 52; 717/164, 165, 717/166, 167, 174, 140; 707/100, 101, 102, 707/200; 706/20, 19; 715/500, 514
See application file for complete search history.

(56) References Cited

U.S. PATENT DOCUMENTS 5,745,759 A * 4/1998 Hayden et al. ............. 719/318
6,609,227 B2 8/2003 Bradley et al.
6,654,948 B1 * 11/2003 Konuru et al. .............. 717/127
6,745,350 B1 6/2004 Cline et al.
2002/0138321 A1 9/2002 Yuan et al.
2006/0046711 A1 * 3/2006 Jung et al. ................... 455/423
2006/0085391 A1 * 4/2006 Turski et al. ................. 707/3
2006/0112119 A1 * 5/2006 Vian et al. .................. 707/101
2006/0149407 A1 * 7/2006 Markham et al. ........... 700/108
2006/0173801 A1 * 8/2006 Music ......................... 706/45
2006/0212571 A1 * 9/2006 Tanaka et al. .............. 709/224
2006/0212823 A1 * 9/2006 Bhagat et al. .............. 715/783
2006/0212855 A1 * 9/2006 Bournas et al. ............. 717/140
2006/0244585 A1 * 11/2006 Bishop et al. .............. 340/506
2006/0265746 A1 * 11/2006 Farley et al. ................. 726/22
2006/0268967 A1 * 11/2006 Drezet ........................ 375/224

OTHER PUBLICATIONS

U.S. Appl. No. 11/081,898 entitled, "Systems, Methods and Computer Program Products for Configuring an Assembly Line," filed Mar. 16, 2005.
U.S. Appl. No. 11/081,899 entitled, "Methods, Systems and Computer Program Products for Implementing Production Processes" filed Mar. 16, 2005.

* cited by examiner

*Primary Examiner*—Ramesh Patel
(74) *Attorney, Agent, or Firm*—Myers Bigel Sibley & Sajovec, P.A.

(57) ABSTRACT

In the implementation of a production process, event data corresponding to a parent event that has triggered an executable business process that has failed is logged. The event data is displayed to a user. Responsive to input from the user, a child event based on the event data is generated, and the child event is submitted to a process engine to initiate re-execution of the executable business process in accordance with the child event.

20 Claims, 30 Drawing Sheets

FIG. 3B

| Current Configuration | |
|---|---|
| Name | PPWGuide |
| Level | 1.0 |

New Configuration

Name*

Level*   1.1

New Description

New Deploy To Server Name   Server1 ▶

[Save] [Cancel]

Message Configuration — 130A

Message Task
[ Select a Task ▶ ] — 132A

Message Name *
[                    ]

Message Name Space *
[                    ]

[ Delete ] [ Create ] [ Copy ] [ Reset ]

Message Part Configuration — 134

| Name | Type | Name Space |
|---|---|---|
| associated | string | http://www.w3.org/2001/XMLSchema |
| buildinfo | string | http://www.w3.org/2001/XMLSchema |
| buildinfotype | string | http://www.w3.org/2001/XMLSchema |
| eventname | string | http://www.w3.org/2001/XMLSchema |
| eventsource | string | http://www.w3.org/2001/XMLSchema |
| eventtime | string | http://www.w3.org/2001/XMLSchema |
| lotnumber | string | http://www.w3.org/2001/XMLSchema |
| optioncode | string | http://www.w3.org/2001/XMLSchema |
| partnumber | string | http://www.w3.org/2001/XMLSchema |
| reason | string | http://www.w3.org/2001/XMLSchema |
| serialnumber | string | http://www.w3.org/2001/XMLSchema |
| status | string | http://www.w3.org/2001/XMLSchema |
| vin | string | http://www.w3.org/2001/XMLSchema |

Name *          Type          Name Space
[        ]   [ Int ▶ ]   [ http://www.w3.org/2001/XML_Sche ]

[ Update/Create Field ]   [ Delete Field ]

FIG. 8B

Process Point: Cutter1379    Process: DataCollection

| Name | Type | Default Value | Override Event Value |
|---|---|---|---|
| associated | string | | O |
| buildinfo | string | | O |
| buildinfotype | string | | O |
| eventname | string | | O |
| eventsource | string | | O |
| eventtime | string | | O |
| lotnumber | string | | O |
| optioncode | string | | O |
| partnumber | string | | O |
| reason | string | | O |
| serialnumber | string | | O |
| status | string | | O |
| vin | string | | O |

160B

Name*

Type

Default Value*

☐ Override Event Value*

[Clear Field] [Update Field] [Save Changes] [Return]

Interval
0

Units
Year ▶

Start Time
7 ▶ : 59 ▶ : 13 ▶

End Time
7 ▶ : 59 ▶ : 13 ▶

Start Date
2004-12-10
Set Date

End Date
2004-12-10
Set Date

Save   Clear   Return

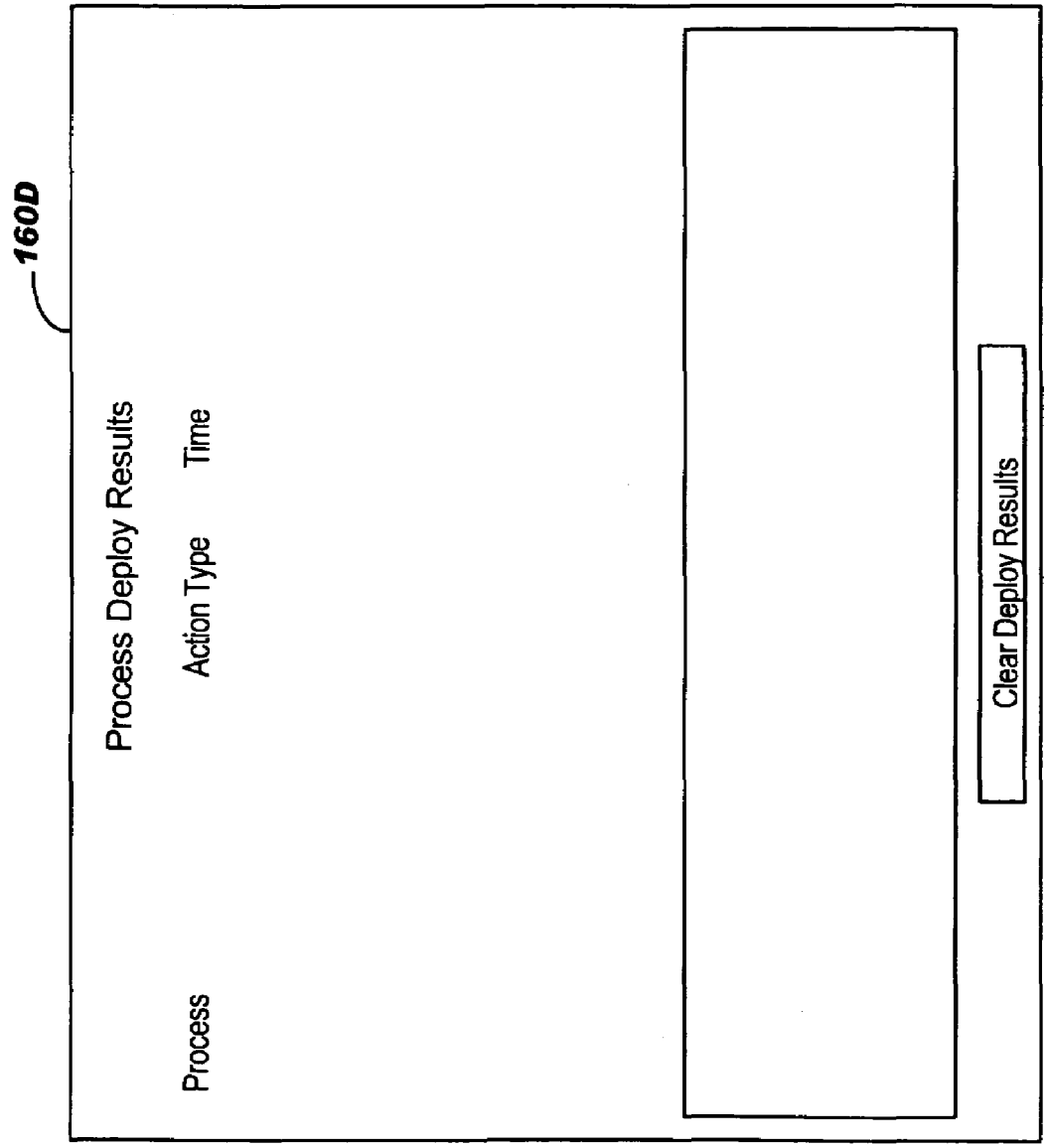

Recovery Event Log

Event Selection Criteria

Level: [All Levels ▼]

Start Date (yyyy-mm-dd)  Start Time (hh-mm-ss)
[2005-06-05] [Set Date]  [11 ▶] [15 ▶] [55 ▶]

End Date (yyyy-mm-dd)  End Time (hh-mm-ss)
[2005-06-06] [Set Date]  [11 ▶] [15 ▶] [55 ▶]

[Submit]  [Reset]

Event ID: [    ]

[Submit]  [Reset]

Logged Events

| Event ID | Actions | Name | Source | Log Timestamp | State | Parent Event ID |
|---|---|---|---|---|---|---|
| 104522747070 | ⬆ | WIPTracking1 | PaintShop1\|13 | 2005-06-06 10:56:42.806 | InProgress | null |
| 104522747070 | ⬆ | WIPTracking1 | PaintShop1\|13 | 2005-06-06 10:57:02.322 | Success | null |
| 10452274fab70 | ⬆ | WIPTracking1 | PaintShop1\|14 | 2005-06-06 10:57:28.775 | InProgress | null |
| 10452274fab70 | ⬆ | WIPTracking1 | PaintShop1\|14 | 2005-06-06 10:57:30.619 | Success | null |
| 104526514ce0 | ⬆ | TestRecoveryUtility | PaintShop1\|13 | 2005-06-06 12:05:10.525 | InProgress | null |
| 104526514ce0 | ⬆ | TestRecoveryUtility | PaintShop1\|13 | 2005-06-06 12:05:25.103 | Success | null |
| 1045266686880 | ⬆ | TestRecoveryUtility | PaintShop1\|13 | 2005-06-06 12:05:40.072 | InProgress | null |
| 1045266686880 | ⬆ | TestRecoveryUtility | PaintShop1\|13 | 2005-06-06 12:05:42.65 | Error | null |

FIG. 15

IMPLEMENTING PRODUCTION PROCESSES

BACKGROUND OF THE INVENTION

In general, the present invention provides a system, graphical user interface (GUI), method and computer program product for graphically and dynamically configuring an assembly line.

Assembly lines have long been used to provide an automated way to manufacture a line of goods such as automotive components, electronic components, etc. In today's world, an assembly line generally includes work "cells" that are logically referred to as "process points." Each process point performs a specific operation as a good passes through a line. For example, one process point could be responsible for painting the exterior of an automobile, while another could be responsible for putting tires on the automobile. The work performed at each process point is usually the same for all goods passing through the line. Moreover, work performed at a process point could be associated with one or more computer processes. In such cases, an operator at the process point will trigger the computer process using a device connected to a central computer that controls the line. Alternatively, the computer process could be triggered automatically as a good reaches the process point. In either event, the results of the computer process will either be returned to the process point device, stored in a local database system, or forwarded to another system.

In today's manufacturing environment, work cells and process points are statically configured with the central computer. That is, the assembly line configuration is defined before the goods are assembled, and will remain unchanged throughout the complete assembly of goods. The central computer will typically use a hard-coded file to identify requests coming from the work cells, and associate the requests with processes to perform their functions. The hard-coded file is linked with computer software to run the assembly line prior to starting the assembly of goods. Hence, if a computer device fails while executing a work cell process, it will not be possible to reconfigure the work cell to replace the failed device by an operable device and resume operation of the line. Accordingly, the current static methodology can lead to a considerable waste of time and resources.

BRIEF SUMMARY OF THE INVENTION

According to embodiments of the present invention, a computer-implemented method for implementing a production process comprises: logging event data corresponding to a parent event that has triggered an executable business process that has failed; displaying the event data to a user; and, responsive to input from the user, generating a child event based on the event data, and submitting the child event to a process engine to initiate re-execution of the executable business process in accordance with the child event.

According to further embodiments of the present invention, a computer program product for implementing a production process comprises: a computer readable medium having computer readable program code embodied therein, the computer readable program code comprising: computer readable program code configured to log event data corresponding to a parent event that has triggered an executable business process that has failed; computer readable program code configured to display the event data to a user; and computer readable program code configured, in response to input from the user, to generate a child event based on the event data, and submit the child event to a process engine to initiate re-execution of the executable business process in accordance with the child event.

According to further embodiments of the present invention, a system for implementing a production process comprises at least one application server configured to: log event data corresponding to a parent event that has triggered an executable business process that has failed; display the event data to a user; and, responsive to input from the user, generate a child event based on the event data, and submit the child event to a process engine to initiate re-execution of the executable business process in accordance with the child event.

Further features and details of the present invention will be appreciated by those of ordinary skill in the art from a reading of the figures and the detailed description of the embodiments that follow, such description being merely illustrative of the present invention.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIGS. 3A and 3B depict illustrative interface pages for configuring a version of the assembly line.

FIGS. 5A–5D depict illustrative interface pages for configuring messages according to an aspect of the present invention.

FIGS. 8A–8D depict illustrative interface pages for configuring process points according to an aspect of the present invention.

FIGS. 14–19 depict illustrative interface pages for retrieving logged event data and for configuring and submitting a child event according to aspects of the present invention.

Figure 1:
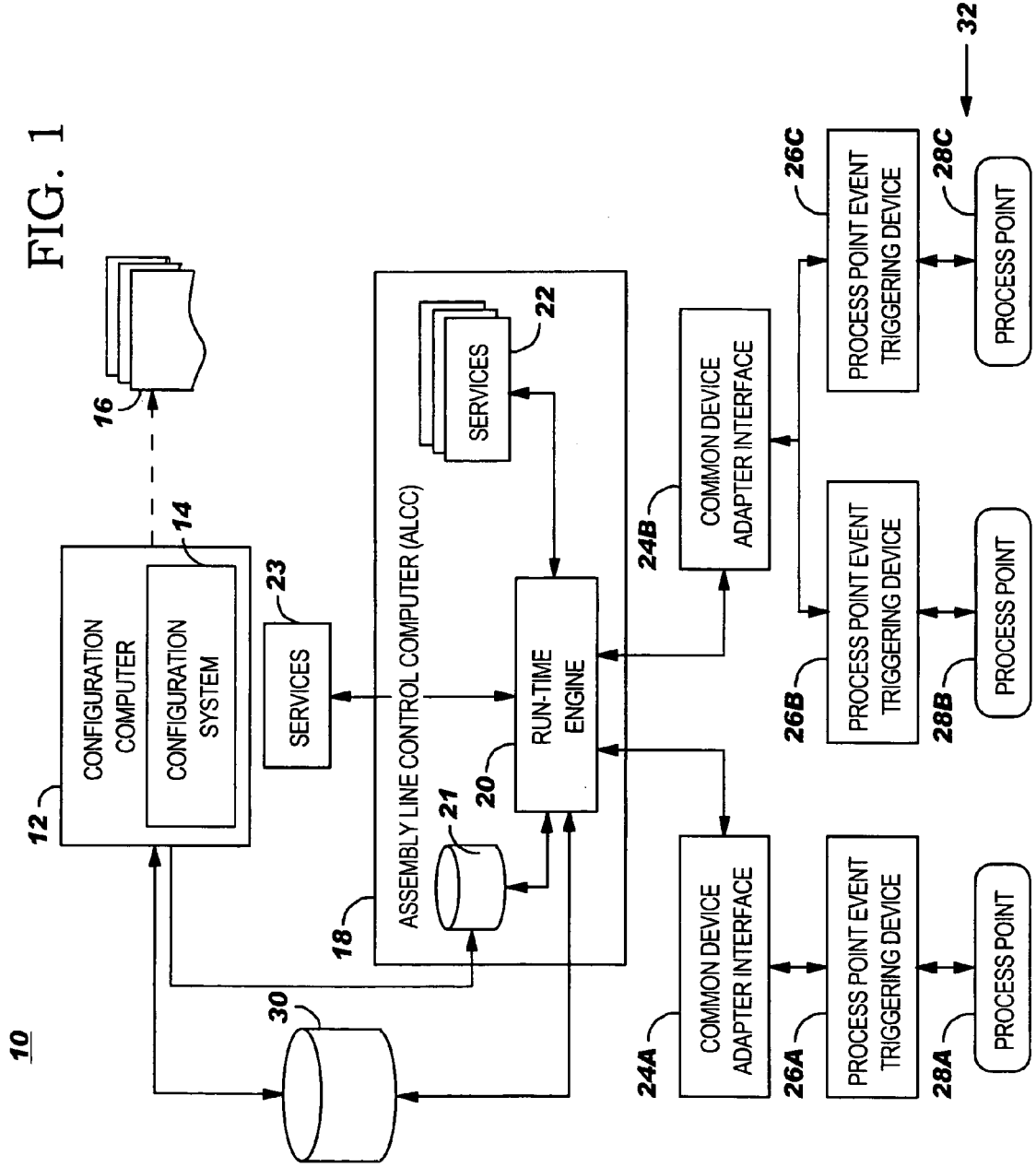
FIG. 1 depicts a system for graphically and dynamically configuring an assembly line of goods according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the following terms shall have the following meanings:

Process Point—A "process point" is a place where manufacturing activities are performed to produce or transform a product. A process point is typically a logical location in a "shop." An assembly line is generally a collection of process points.

Event—An "event" is a trigger at a process point and is typically associated with a Work in Progress (WIP) movement, manufacturing activities like part installation, detection of exceptional condition, etc. An event may be triggered from a device, a person (e.g., via a terminal), a sub-system (e.g., quality information collection system), etc.

Action—An "action" is a function (e.g., of a Manufacturing Execution System (MES)) to support operations. It is a unit of work and, hence, any actions can be combined within a single process independently. Most actions are reusable and are used in different process points repeatedly. For instance, a "broadcast action" may be used in multiple process points to distribute manifest papers to different shops.

Service—A "service" is a computer implementation of an action. In accordance with embodiments of the present invention, actions are implemented by Web Services, which may be internal or external.

Manufacturing Process (or Process)—A "process" is a sequential set of services to be invoked by the Assembly Line Controller (ALC) in response to a triggering event. Each process may have different set of services.

Message—A "message" is a set of attributes (e.g., specification by name, type and value) associated with a process either as input or output.

Web Service—"Web Services" are Internet and intranet-based, self-contained, modular applications that perform specific tasks, and are initiated automatically by programs through the use of Internet standard technologies. Web Services employ interactions (e.g., binding, finding, etc.) implemented by the exchange of extensible Markup Language (XML) messages. Web Services make it possible to integrate systems that would otherwise require extensive development efforts. Web Services provide a simple and streamlined mechanism for applications to communicate over the Internet/intranet using established standards and technologies and without human intervention (i.e., program to program interaction), and without the need to know the environment at each end point.

Web Services Description Language (WSDL)—WSDL is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate. According to some embodiments, the WSDL is used in conjunction with SOAP, HTTP GET/POST, and MIME.

Business Process Execution Language (BPEL)—BPEL is an XML-based language that enables the formal specification of business processes and business interaction protocols. By doing so, it extends the Web Services interaction model and enables it to support business transactions. BPEL defines an interoperable integration model that should facilitate the expansion of automated process integration in both the intra-corporate and the business-to-business spaces.

Name space—"Name spaces" are second level identifier names that enable one to specify two messages with the same name but with different name spaces.

The Internet—As is well known, the Internet is a computer network consisting of a worldwide network of computer networks that use the TCP/IP network protocols to facilitate data transmission and exchange.

"Executable business process"—A business process is a series of activities that are invoked in a specific order to achieve a business goal. Executable business processes are definitions that are designed to describe the ordering of business activities that send and/or receive messages. The definition of the flow between activities is computationally complete (i.e., it can be executed). The messages may be sent to/from: a) an independent business entity to itself and b) an independent business entity to another (participant).

The present invention provides a system, GUI, method and program product for graphically and dynamically configuring an assembly line of goods using Web Services. Specifically, under the present invention, a GUI is provided that allows an assembly line to be both graphically and dynamically configured. In general, the GUI allows a designer or the like to "graphically" configure: a hierarchy of categories representing the assembly line; the process points along the assembly line; the services that are taken in response to triggering events at the process points; the different processes (flow of services) that can be invoked as a result of the events at the process points; and the input and output messages associated with the events. The GUI may also allow the designer to graphically select an existing version of an assembly line or initiate the creation of a new assembly line configuration. According to some embodiments, the GUI is maintained on a system that is separate from the central computer controlling the assembly line. This not only allows the assembly line to be configured remotely, but also without ceasing operation of the line.

Referring now to FIG. 1, a system 10 for configuring an assembly line 32 is shown. As indicated above, assembly lines are typically a collection of work cells. Each work cell is logically referred to as a process point, which (as indicated above) is a place where manufacturing activities are performed to produce or transform a product. In the illustrative example shown in FIG. 1, the assembly line 32 includes process points 28A–C. The system 10 further includes an assembly line control computer (ALCC) 18, which itself includes a deployment or run-time engine 20. The run-time engine 20 is connected to a run-time database 21, internal services 22 (e.g., via intranet), and external services 23 (e.g., via the Internet). According to some embodiments, the run-time engine 20 employs and executes BPEL processes.

As the process points 28A–C are performing their assigned tasks, certain events will occur. As known, an event is typically associated with a Work in Progress (WIP) movement, manufacturing activities, the detection of an error condition, etc. Events can be triggered in a number of ways such as by process point triggering devices 26A–C (as shown in FIG. 1 for illustrative purposes), personnel (e.g., via terminals), via sub-systems (e.g., quality information collection systems), etc. As events are triggered, they will be communicated to the run-time engine 20 via common device adapter interfaces 24A–B. As further shown in FIG. 1, multiple triggering devices 26B–C and process points 28B–C can share a common device adapter interface 24B. Upon receiving notification of an event, the run-time engine 20 will attempt to determine a set of services 22, 23 that should be invoked in response.

The system 10 enables a designer or the like to dynamically configure the assembly line 32 via a configuration computer 12. That is, the configuration of the assembly line 32 is provided independent of the ALCC 18. The configuration computer 12 includes a configuration system 14 which includes a build-time engine and provides a GUI (e.g., a set of interface pages) 16 for graphically configuring the assembly line 32. This configuration can be stored in a build-time database or storage unit 30 for subsequent access by the ALCC 18 and/or subsequent modification via the configuration system 14. Portions of this configuration may be deployed to the run-time database 21 (directly or via the run-time engine 20) for use by the run-time engine 20.

Figure 2:
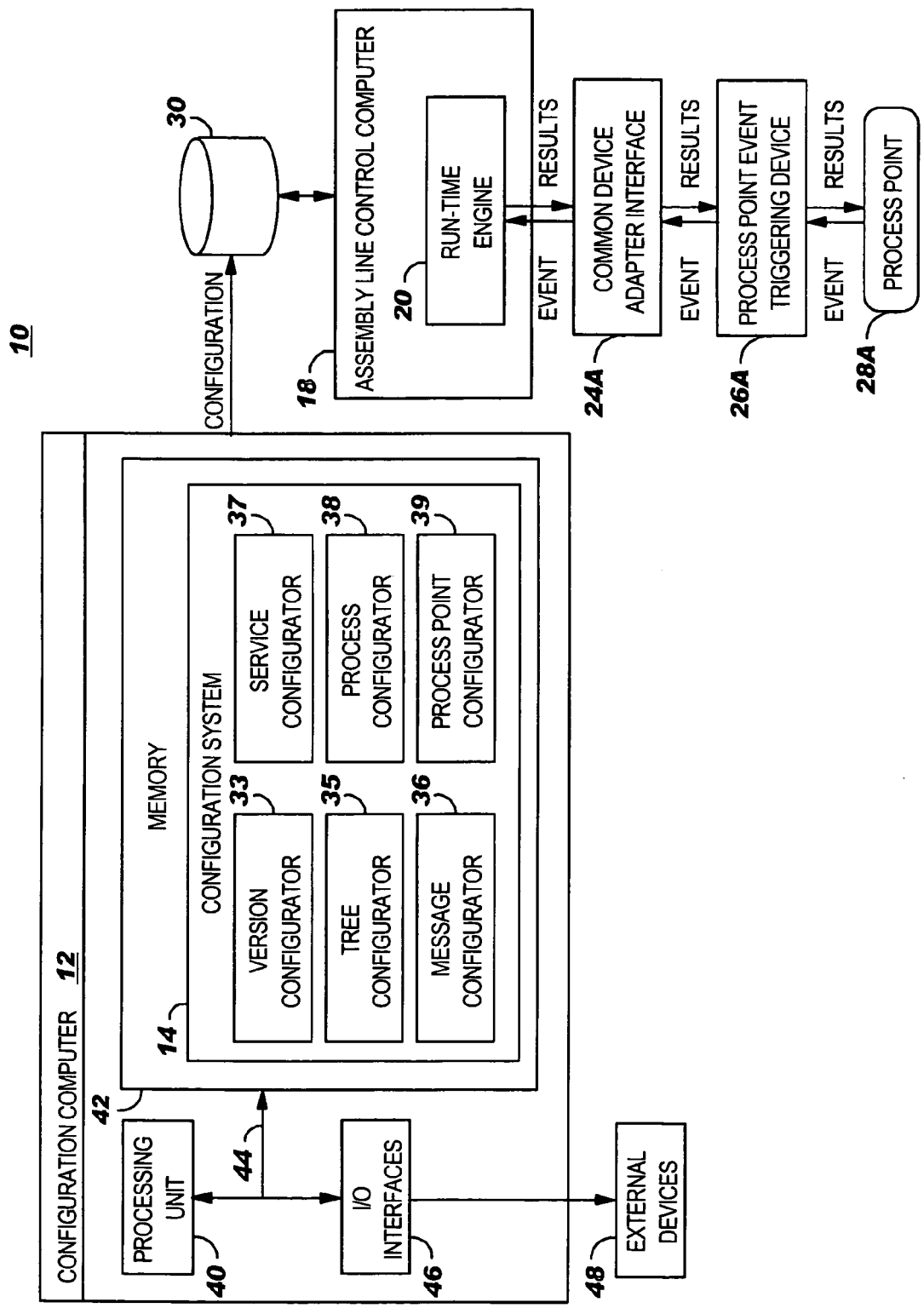
FIG. 2 depicts the configuration system of FIG. 1 in greater detail.

Referring to FIG. 2, a more detailed diagram of the configuration computer 12 is shown therein. FIG. 2 depicts only a single process point 28A, process point triggering device 26A and common device adapter interface 24A for simplicity. These single elements will be used below to describe a particular illustrative example. Nevertheless, the configuration computer 12 is intended to represent any type of computer that is capable of carrying out the functions of the present invention. For example, the configuration computer 12 could be a desktop computer, a laptop, a workstation. Moreover, the configuration of the assembly line 32 can occur on a stand-alone configuration computer or over a network. In the case of the latter, the configuration computer 12 could be a client or a server. Also, the network could be any type of network such as the Internet, a local area network (LAN), a wide area network (WAN), a virtual private network (VPN), etc. Communication throughout the network could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity.

As depicted, the configuration computer 12 generally includes a processing unit (CPU) 40, memory 42, a bus 44, input/output (I/O) interfaces 46, and external devices/resources 48. The CPU 40 may comprise a single processing unit, or be distributed across one or more processing units in one or more locations, e.g., on a client and server. The memory 42 may comprise any known type of data storage and/or transmission media, including magnetic media, optical media, random access memory (RAM), read-only memory (ROM), a data cache, a data object, etc. Moreover, similar to the CPU 40, the memory 42 may reside at a single physical location, comprising one or more types of data storage, or be distributed across a plurality of physical systems in various forms.

The I/O interfaces 46 may comprise any system for exchanging information to/from an external source. The external devices/resources 48 may comprise any known type of external device, including speakers, a CRT, LED screen, hand-held device, keyboard, mouse, voice recognition system, speech output system, printer, monitor/display, facsimile, pager, etc. The bus 44 provides a communication link between each of the components in the configuration computer 12 and likewise may comprise any known type of transmission link, including electrical, optical, wireless, etc.

The build-time storage unit 30 can be any system (e.g., a database, etc.) capable of providing storage for information under the present invention. As such, the storage unit 30 could include one or more storage devices, such as a magnetic disk drive or an optical disk drive. In another embodiment, the storage unit 30 includes data distributed across, for example, a local area network (LAN), wide area network (WAN) or a storage area network (SAN) (not shown). Although not shown, additional components, such as cache memory, communication systems, system software, etc., may be incorporated into configuration computer 12. In addition, it should be understood that the ALCC 18 will likely include computerized components similar to the configuration computer 12. Such components have not been shown for simplicity.

Shown in the memory 42 is the configuration system 14, which includes a version configurator 33, a tree configurator 35, a message configurator 36, a service configurator 37, a process configurator 38, and a process point configurator 39. The functions of each of these configurators will be further described below in conjunction with FIGS. 3–8. However, in general, each of these configurators typically provides at least one interface page for allowing dynamic and graphical configuration of the assembly line by an authorized configuring user or the like (not shown). As the assembly line is configured, the configuration details will be stored in one or more tables within the storage unit 30 and the run-time database 21 for subsequent access by the ALCC 18 and, more particularly, the run-time engine 20. It should be appreciated that the manner in which configurators are shown within the configuration system 14, and the order in which they are described below, is intended for illustrative purposes only and is not meant to limit the present invention. That is, the various configurators could be shown in any manner and described in any order.

According to some embodiments, a user with an authorized role must first choose a line configuration version to work with during the current session prior to performing any tasks. The version configurator 33 can be used to create an empty new version of a line configuration, copy the contents of an existing line configuration version to a new one, delete an existing line configuration version, or select an existing line configuration version to edit in the current session. A line configuration version consists of a line configuration, its associated messages, services, processes and configuration of process points.

Figure 3A:
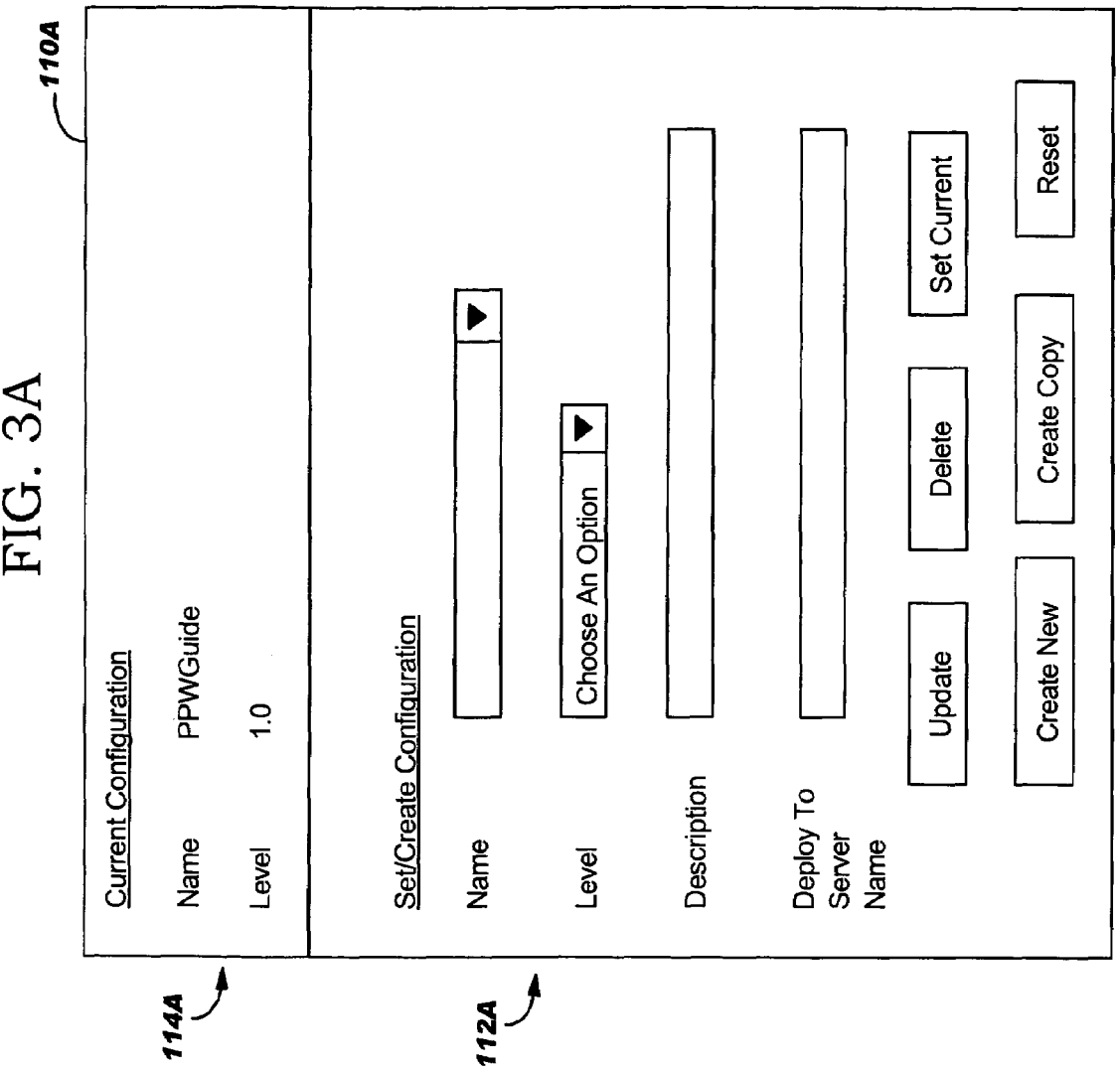

Referring now to FIGS. 3A and 3B, an illustrative version configuration interface page 110A as provided by the version configurator 33 is shown in FIG. 3. As depicted, the interface page 110A includes a portlet 112A. Using the interface page 110A, the following functions can be performed:

Creating a new line configuration version—In the portlet 112A, the user enters the name, level and description of the line configuration to be created in the corresponding fields. The user also enters in the "Deploy To Server Name" field an appropriate name to specify the server to which the configuration data will be directed upon deployment, and clicks the "Create New" button.

Copying from an existing line configuration version—In the portlet 112, the user first selects the version to copy from the "Name" and "Level" pull down menus, and then clicks on the "Create Copy" button. The existing line configuration may be copied from the build-time database 30. The interface page 110A is then replaced with a revised interface page 110B having a portlet 112B as shown in FIG. 3B. In the portlet 112B, the user then enters the name, level and description for the new configuration in the appropriate fields, selects the appropriate sewer from the "New Deploy to Server Name" pull down menu, and clicks "Save."

Deleting an existing line configuration version—In the portlet 112A (FIG. 3A), the user selects the name and the level of the version to be deleted using the "Name" and "Level" pull down menus, and then clicks on the "Delete" button.

Selecting the working line configuration version (i.e., the line configuration version to be built or edited in the current session)—In the portlet 112A, the user selects the name and the level of the version to work on in this session using the "Name" and "Level" pull down menus, and clicks on the "Set Current" button in the portlet 112A.

During use, the interface page 110A will list the currently designated working line configuration and level (if any) in the upper portion of the interface page. The user may reset the interface page 110A and undesignate the currently designated working line configuration and level by clicking on the "Reset" button in the portlet 112A.

The tree configurator 35 is used to define where each process fits into a hierarchy of categories, such as plant location or assembly line zone. For example, this hierarchical tree can be a valuable representation of the integration points of a manufacturing floor with manufacturing applications such as Quality, Inspection, Material Management, Error Proofing, Replenishment, Order Management and others, and may provide a centralized integration system. Each process point of the line configuration will be defined as a category node using the tree configurator 35 or by pre-designation (e.g., copied from an earlier version). Some categories may not have processes attached thereto.

Figure 4A:
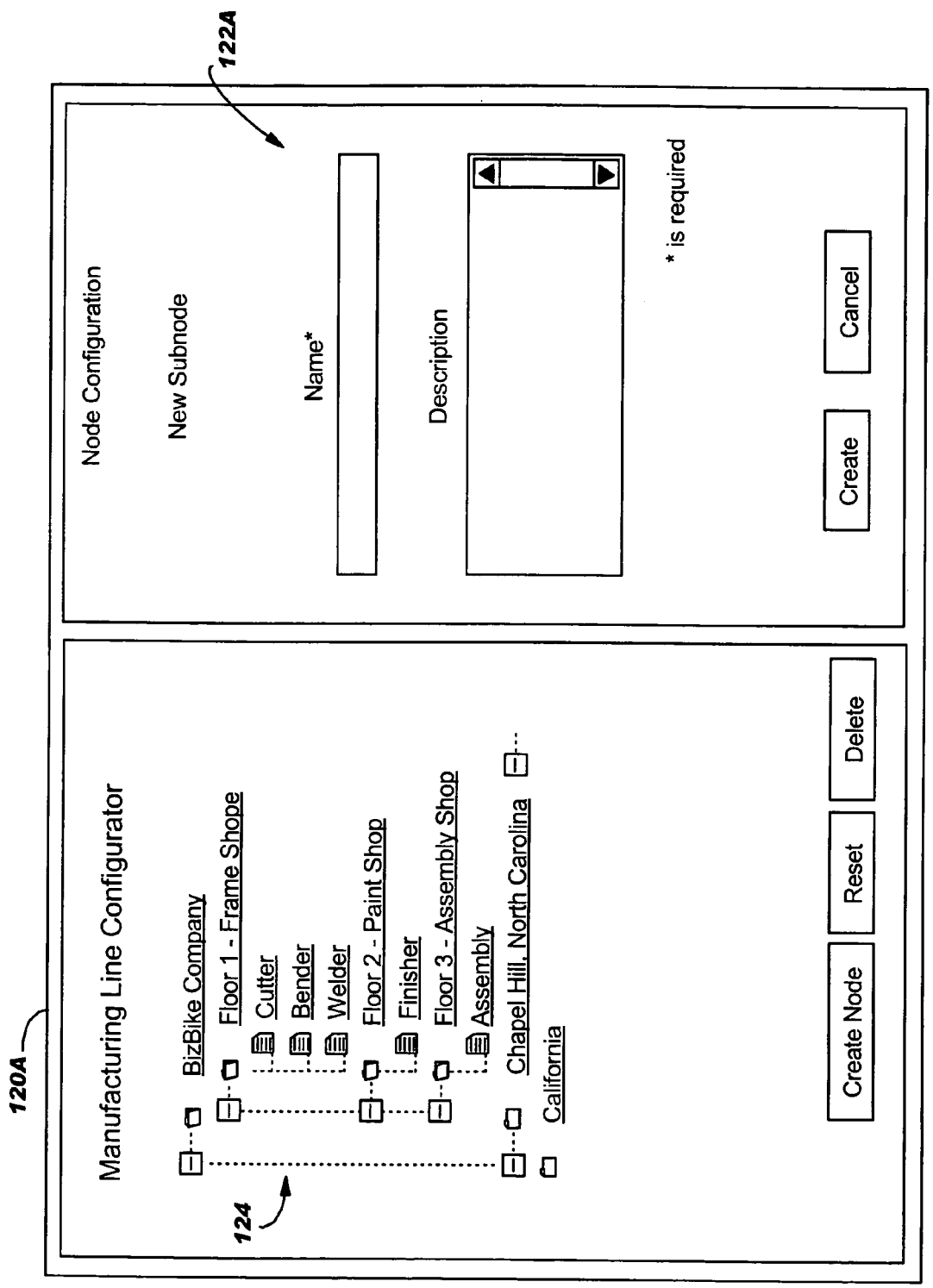
FIGS. 4A and 4B depict illustrative interface pages for configuring the assembly line as a tree or hierarchy of categories according an aspect of to the present invention.
Figure 4B:
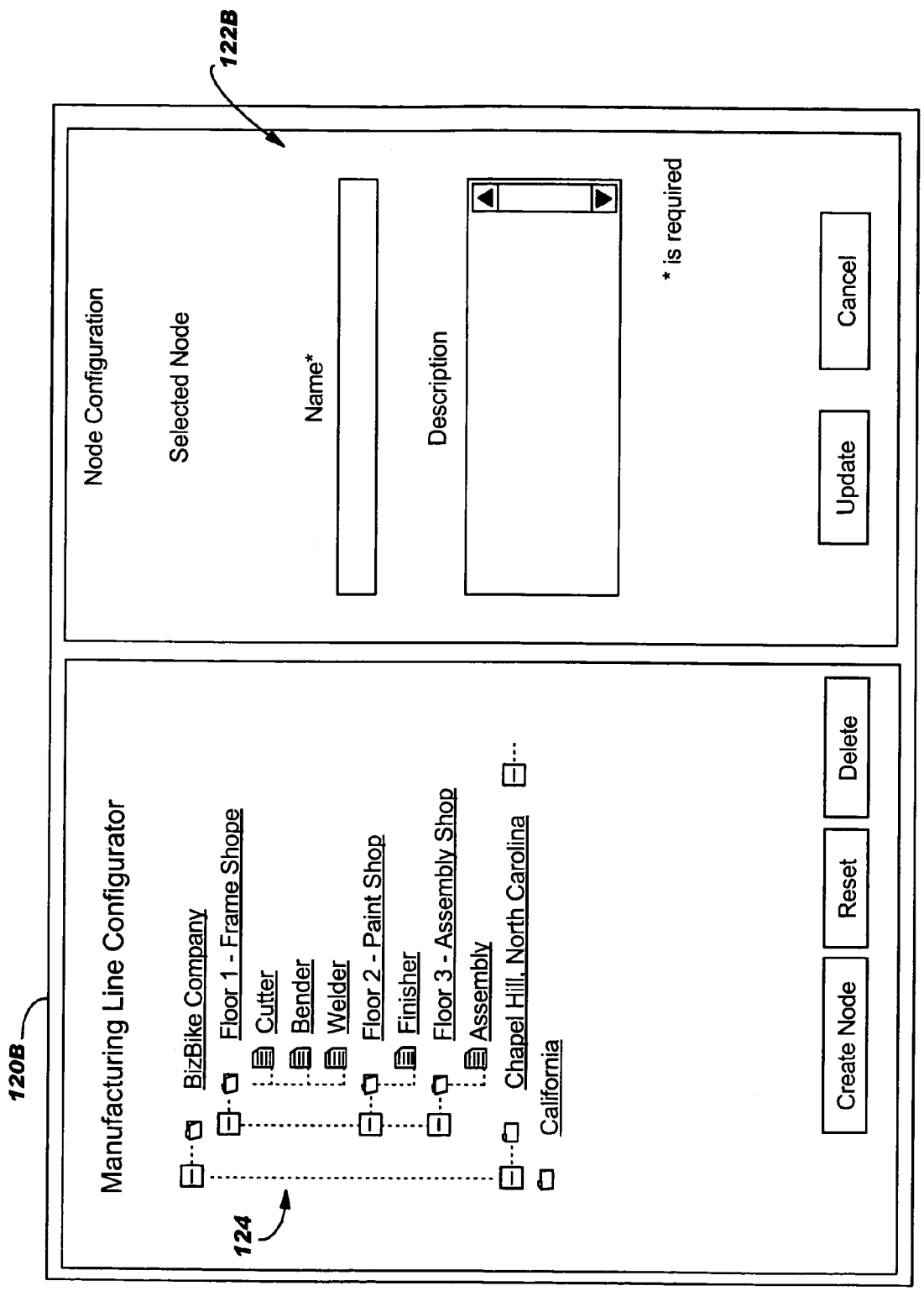

Referring now to FIGS. 4A and 4B, illustrative tree configuration interface pages 120A (FIG. 4A) and 120B (FIG. 4B) as provided by the tree configurator 35 are shown. As depicted, the interface pages 120A, 120B each include an up to date hierarchical tree portlet 124 including a representation of the assembly line. The interface pages 120A and 120B also include respective portlets 122A and 122B. Using the interface pages 120A, 120B, the following functions can be performed:

Creating a new category—To perform this task, the configuring user will use the tree portlet 124 to identify and select the parent node of the new category node to be inserted (i.e., the node under which the new category node is to be inserted) by clicking on the parent node in the tree portlet 124 and then clicking "Create Node" in the portlet 124, responsive to which the interface page 122A is displayed. The new category node may be a process point. The user then enters the name and a description of the new category in the corresponding fields of the portlet 122A. The user then clicks the "Create" button in the portlet 122A.

Updating an existing category—To perform this function, the configuring user will locate and click on the category/node to be updated in the tree portlet 124 to select the category, which may be a process point. In response, the information corresponding to the selected node is automatically displayed in the appropriate fields of the portlet 122B of the interface page 120B. The user then enters the needed updates in the "Name" and "Description" fields of portlet 122B, and clicks the "Update" function button in the portlet 122B.

Deleting an existing category—To perform this task the configuring user will locate and click on the category/node to be deleted in the tree portlet 124 to select the category (which may be a process point), and click the "Delete" button in the portlet 124.

The user may reset the tree configuration interface page 120 by clicking on the "Reset" button in the portlet 124.

The message configurator 36 is used to define the input and output messages to be associated with processes. Each process is associated with exactly one input message and exactly one output message. Each of the input and output messages contains a respective set of attributes, which, according to some embodiments, is defined by name, type and value. An input message specifies the input data to be received or consumed as input(s) by a process associated with an event. An output message specifies the output data to be produced as output(s) by the process associated with the event. According to some embodiments, the messages are XML name spaces and have values that are Uniform Resource Identifiers (URIs). The name spaces could be any names.

Referring now to FIGS. 5A–5D, illustrative message configuration interface pages 130A, 130B, 130C as provided by the message configurator 36 are shown therein. The interface page 130 includes portlets 132A, 134. The interface page 130B replaces the portlet 132A with a portlet 132 and the interface page 130C replaces the portlet 132A with a portlet 132C. Using the interface pages 130A, 130B, 130C, the following functions can be performed:

Creating a new message—In the portlet 132A of the interface page 130A (FIG. 5A), the user selects the option "Create a message from scratch" from the "Message Task"

pull down menu, enters a name and description in the corresponding fields, and clicks "Create". In the portlet 134, the user then specifies the name, type and name space for each attribute to be added either by 1) directly editing the table displayed in the portlet 134, or 2) entering the name, type and name space of each attribute in the "Name," "Type", and "Name Space" fields at the bottom of the portlet 134. The user clicks "Update/Create Field" after each attribute entry. The attributes will be displayed in the portlet 134 as shown in FIG. 5B.

Figure 5A:
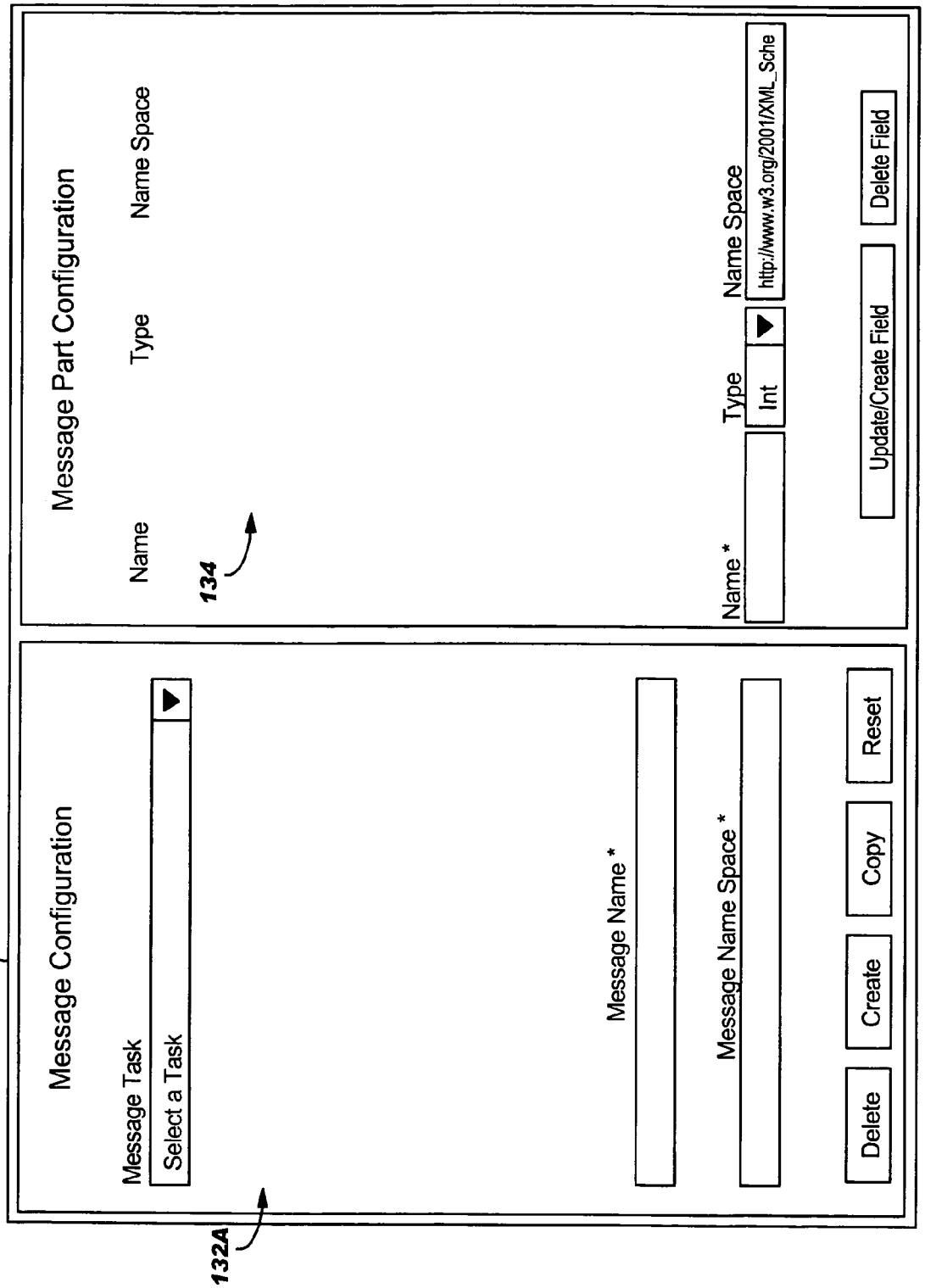
Figure 5C:
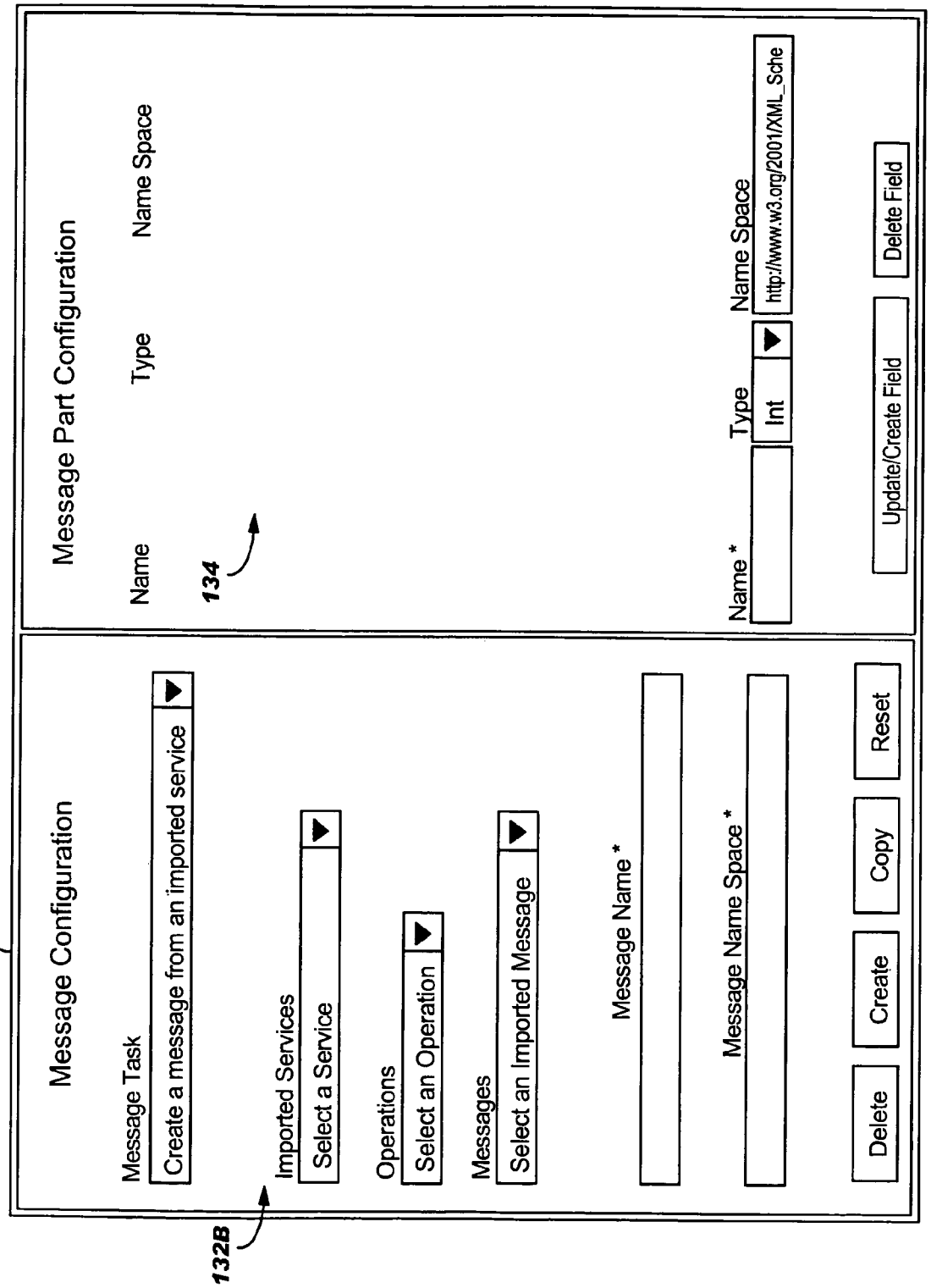
Figure 5D:
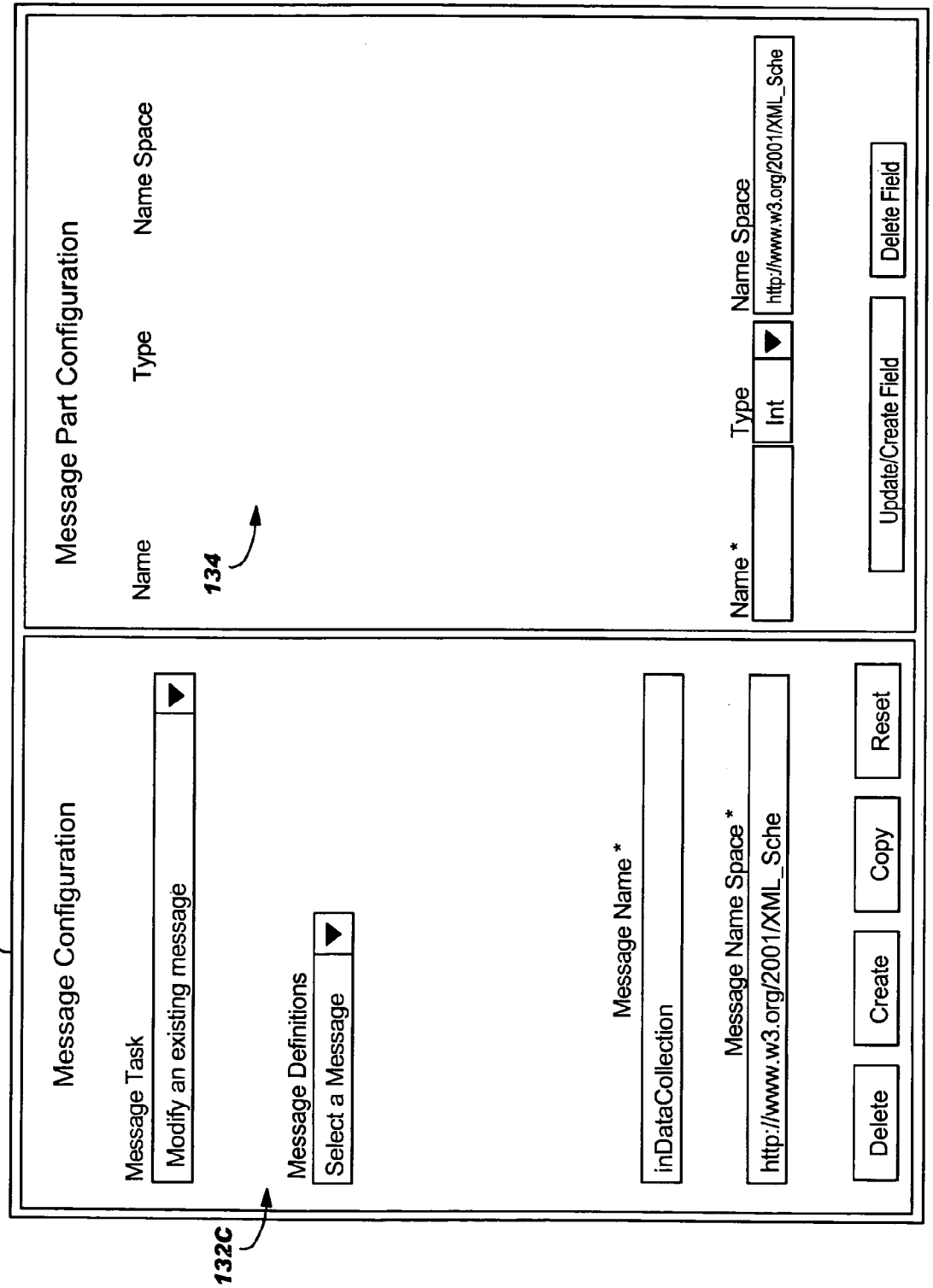

Creating a message from an imported service—In the portlet 132A (FIG. 5A), the user selects the option "Create a message from an imported service" from the "Message Task" pull down menu list. The interface page 130A is automatically replaced by the interface page 130B (FIG. 5C). In the portlet 132B, the user then selects a service from the "Imported Services" menu, selects an operation from the "Operations" menu, selects a message from the "Messages" menu, and enters a message name and a message name space in the corresponding fields. The services listed in the "Imported Services" menu may be, for example, previously configured services. The user then clicks the "Create" button. Thereafter, the user can add and specify attributes for the imported messages in the same manner as described above using the portlet 134. For any attributes listed in the table that the user does not wish to retain in the message definition, the user may click the attribute and then click "Delete" to remove the attribute from the message definition.

Updating an existing message—In the portlet 132A (FIG. 5A), the user selects "Modify an existing message" from the "Message Task" pull down menu, which causes the interface page 130A to be replaced with the interface page 130C (FIG. 5D) having a portlet 132C in place of the portlet 132A. In the portlet 132C, the user selects the message to be updated from the "Message Definitions" pull down menu. Thereafter, the user can modify any attributes by clicking the attribute name in the portlet 134, making the necessary changes in the "Name", "Type" and "Name Space" fields, and thereafter clicking "Update/Create Field". An attribute can be removed by selecting the attribute in the portlet 134 and clicking "Delete."

Deleting a message—The user selects "Modify an existing message" from the "Message Task" menu in the portlet 132C (FIG. 5D), selects the message to be deleted from the "Message Definitions" list, and clicks "Delete."

According to some embodiments, the name of any existing message cannot be changed once it is created. That is, if a change is made to the name of an existing message, a new message is created with the new name but the original message remains with the original name until deleted. According to some embodiments, it is not possible to update or delete a message that is associated with a process.

The service configurator 37 is used to define a service catalog including a listing of Web Services. More particularly, the service configurator is used to define service categories in a tree structure and to import the Web Services definitions (as Web Service Definition Language (WSDL) documents) corresponding to the Web Services from specified Uniform Resource Locator addresses (URLs). A service can also be an internally implemented Enterprise Java-Beans™ (EJB). An authorized user defines the services that can be invoked by the ALCC 18 and, more particularly, the run-time engine 20, as a result of events (e.g., events sent from the plant floor). A service is implemented either as an internal Web Service (i.e., implemented in the ALCC 18 or a local network, e.g., across the Internet) or an external Web Service (i.e., implemented outside the ALCC 18 or the local network).

Figure 6A:
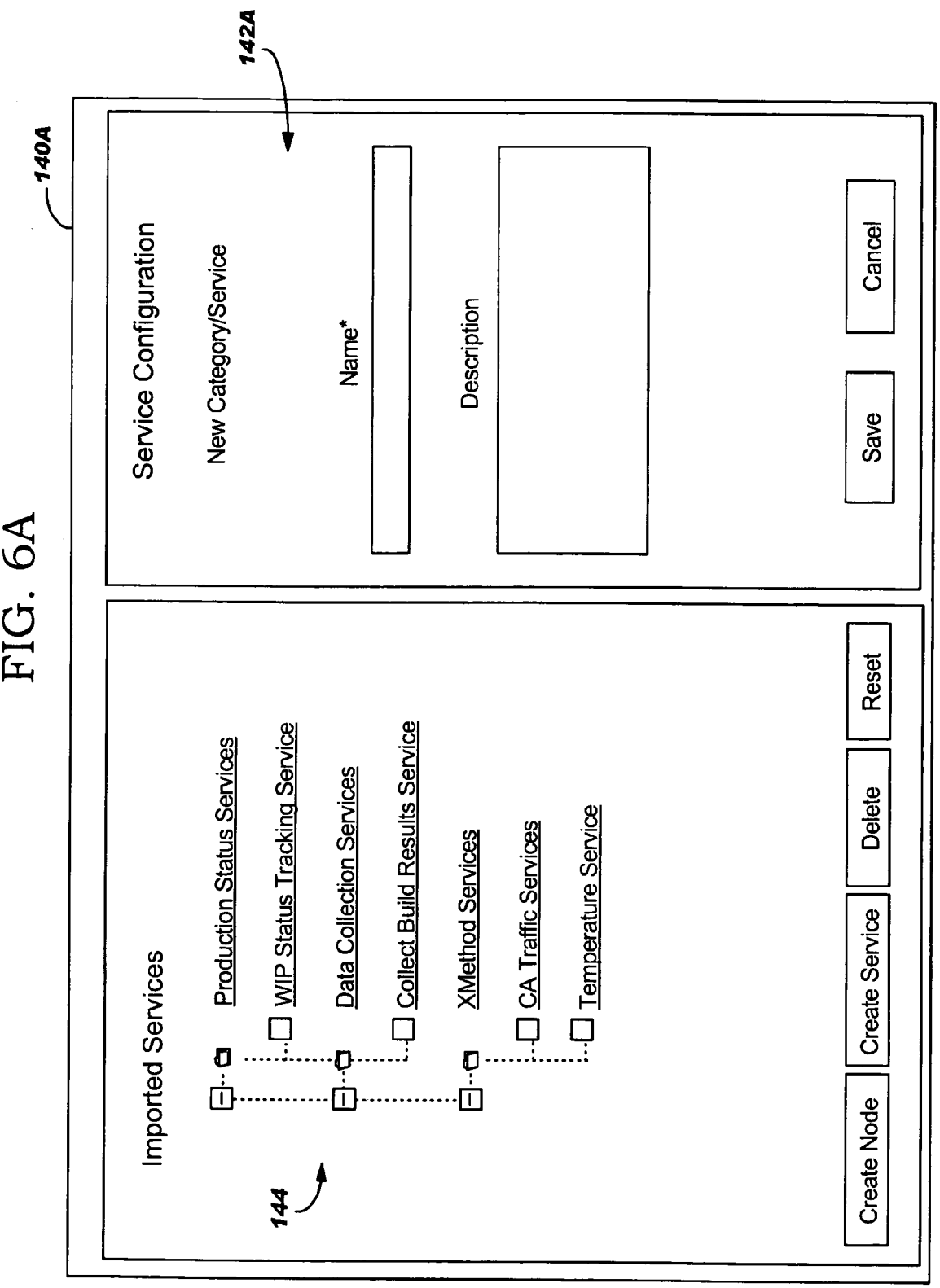
FIGS. 6A and 6B depict illustrative interface pages for configuring services according to an aspect of the present invention.
Figure 6B:
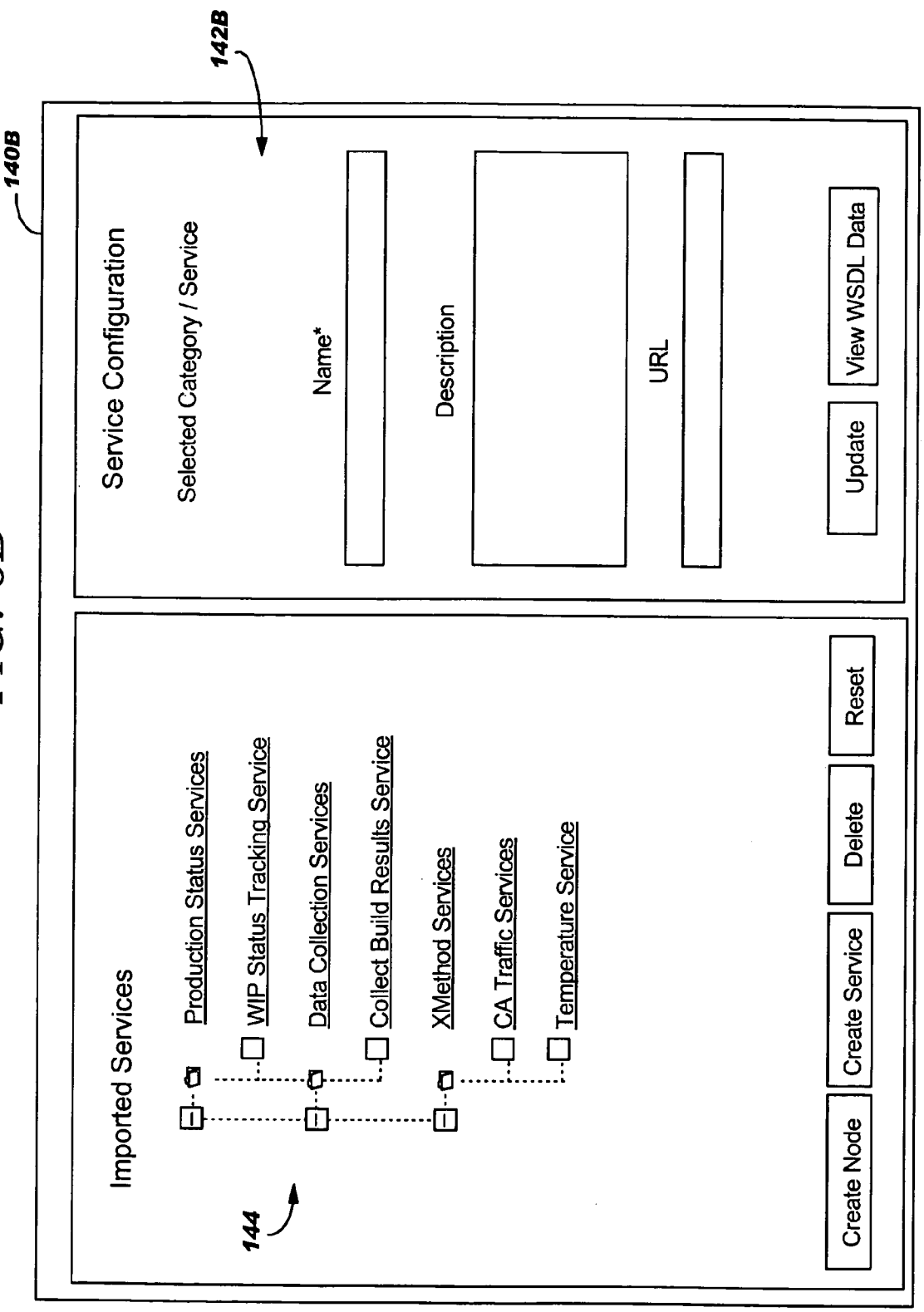

Referring now to FIGS. 6A and 6B, illustrative service configuration interface pages 140A, 140B as provided by the service configurator 37 are shown. As depicted, the interface page 140A includes portlets 142A and 144 and the interface page 140B includes the portlet 144 and a portlet 142B. Using the interface pages 140A, 140B, the following functions can be performed:

Creating a new service category—In the tree of the portlet 144, the user clicks on the parent category listing under which the user wishes to create a child sub-category (if the tree is empty, then by default the parent is the root of the tree) and clicks the "Create Node" button. The user then enters the name and a description of the new service category in the "Name" and "Description" fields of the portlet 142A. The user then clicks on the "Save" button in the portlet 142A.

Updating an existing service category—In the tree of the portlet 144, the user clicks on the listing of the service category to be updated, responsive to which the information corresponding to the selected service category is automatically displayed in the appropriate fields of the portlet 142B of the interface page 140B. In the portlet 142B, the user then revises the name and/or description of the selected service category in the "Name" and "Description" fields and clicks on the "Update" button.

Deleting a service category—In the tree of the portlet 144, the user clicks on the listing of the service category to be deleted. The user then clicks on the "Delete" button in the portlet 144.

Creating a new service—In the tree of the portlet 144, the user clicks on the listing of the service category under which to create the new service, and then clicks the "Create Service" button. The interface page 140B (FIG. 6B) is automatically called up and displayed. The user then enters the name, description of the service, and the Universal Resource Locator (URL) from which the Web Service definition (WSDL document) is to be imported in the "Name", "Description", and "URL" fields of the portlet 142B and clicks on the "Save" button. The WSDL document is then automatically imported by the configuration system 14 via Internet transfer of data using the specified URL.

Updating an existing service—In the tree of the portlet 142, the user clicks on the listing of the service to be updated, responsive to which the information corresponding to the selected service is automatically displayed in the appropriate fields of the portlet 142B of the interface page 140B. The user then revises the name, description and/or the URL in the "Name", "Description", and/or "URL" fields of the portlet 142B, and clicks on the "Update" button. The WSDL document is then automatically imported by the configuration system 14 via Internet transfer of data using the specified URL. Also, the user can simply click on the "Update" button to reload the WSDL document.

Deleting a service—In the tree of the portlet 144, the user clicks on the listing of the service to be deleted. The user then clicks on the "Delete" button.

Additionally, the user may click on a listing of a service of interest in the tree of the portlet 144 and thereafter click on the "View WSDL Data" button in the portlet 142B. The service configurator 37 will then display the WSDL data on another interface page or window.

Referring back to FIG. 2, the process configurator 38 is used to define the processes that are to be carried out as the result of events created by the assembly line process points.

Each process contains a sequential list of services for the ALCC 18 to invoke as a result of a triggered event. A user uses the process configurator 38 to specify a list of services to be invoked for each process (which may be new or pre-existing). To confirm a process, the user assigns exactly one input message and exactly one output message to the process itself, as well as an input message and an output message to each service in the process. The process configurator 38 provides graphical representation and may allow the re-use of defined processes in the configuration of other assembly lines, the ability to re-configure a process of an existing assembly line, and/or the ability to disable a process from an existing configuration.

Figure 7A:
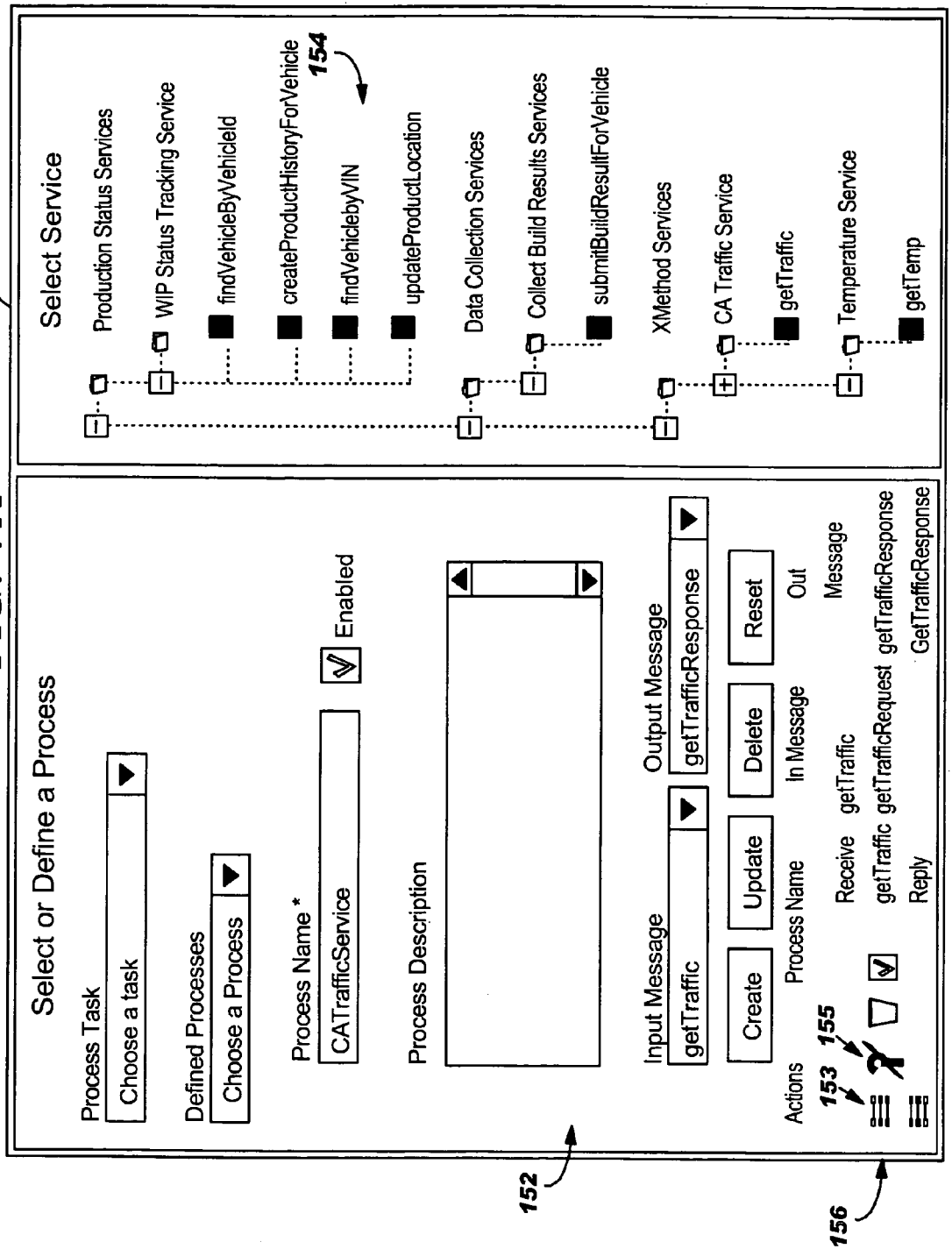
FIGS. 7A–7C depict illustrative interface pages for configuring processes according to an aspect of the present invention.
Figure 7B:
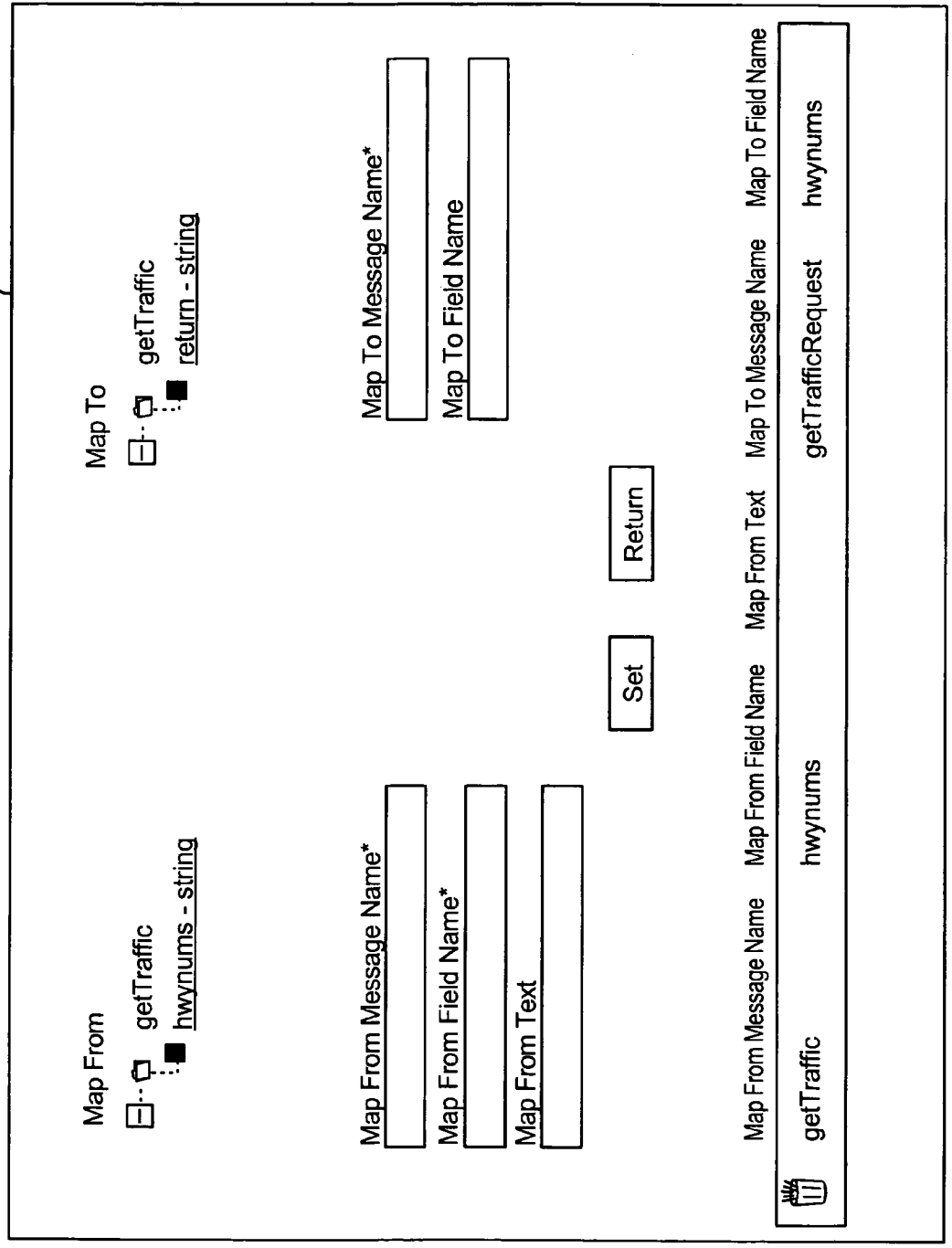
Figure 7C:
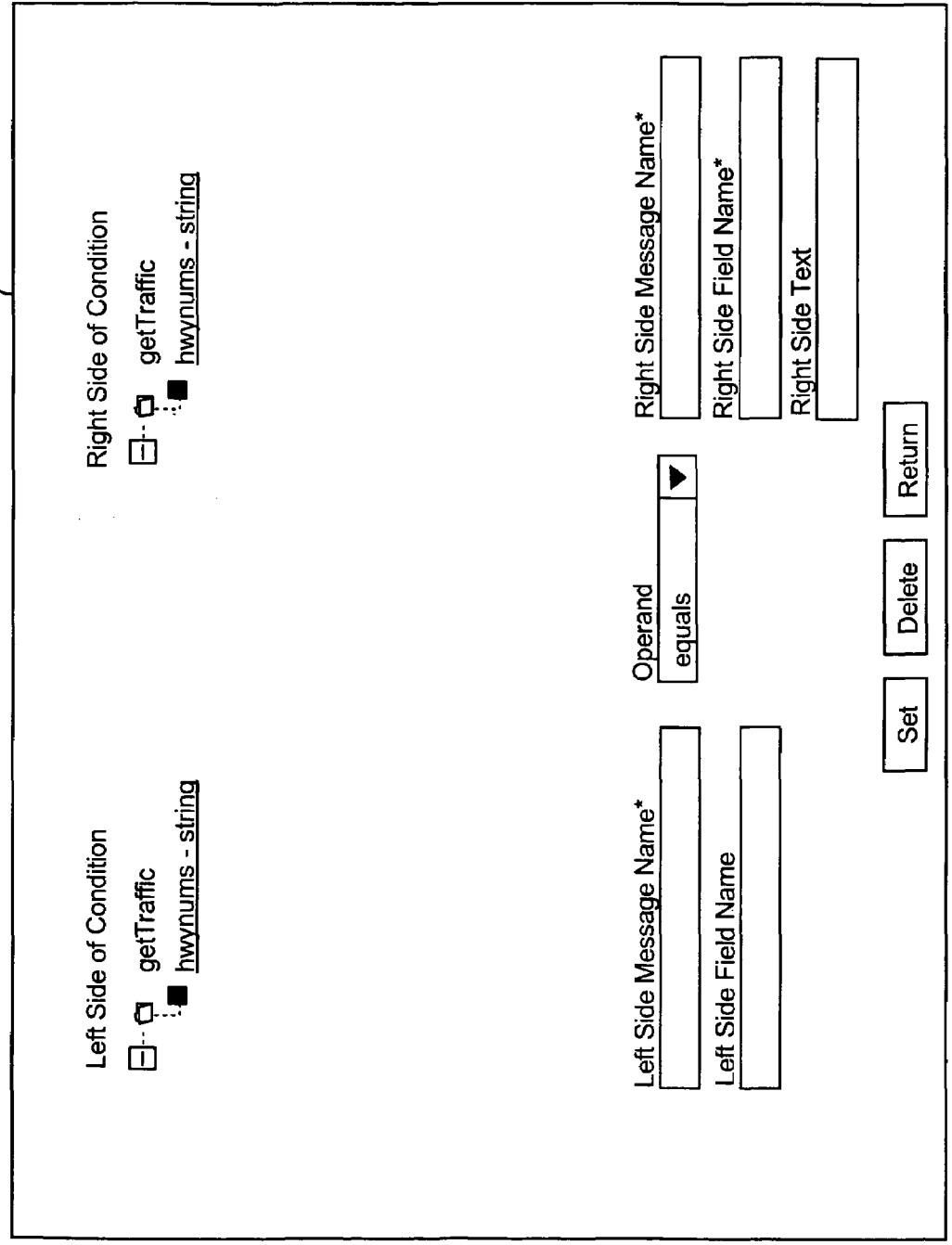

Referring to FIGS. 7A–7C, illustrative process configuration interface pages 150A–150C provided by the process configurator 38 are shown. The interface page 150A includes portlets 152 and 154. In general, the interface pages 150A–150C can be used to perform the following functions:

Creating a new process—In the portlet 152, the user selects "Create a new process" from the "Process Task" menu, enters a name to assign to the new process and a brief description in the "Name" and "Description" fields of the portlet 154, and specifies whether the process is to be enabled or disabled. The user also selects an input message and an output message from the corresponding pull down menus in the portlet 152 to associate with this process. The input and output messages provided in the pull down menus may be some or all of the input and output messages, respectively, that have been created using the message configurator 36. The user then clicks on the "Create" button to create the process.

The user then clicks on each desired service listed in the tree of the portlet 154 to add the selected service to the new process definition. The tree of the portlet 154 displays some or all of the services imported into the current line configuration version (i.e., the services imported using the service configurator 37). The user then clicks "Save" in portlet 152. The process configurator provides the ability to sequence the selected services in any desired order by the order of selection and by adding new services and removing existing ones. The name of each selected service will appear as a sequential listing in a list subportlet 156 of the portlet 152 along with its designated input and output messages (as discussed below). The assigned services can be deleted by clicking on the service name in the subportlet 156 and then clicking the "Delete" button. By default, the final step following the last service will be to "Reply" to the process point with the output message of the process.

For each service added to the process definition, the user must map the input attributes of the service. The GUI provides a mapping capability. The user may use the input message attributes of the process and the output message attributes of the preceding services to define this mapping. For each service, the user clicks on an assign variable icon (not shown) associated with that service. The system 14 will then display the interface page 150B (FIG. 7B). To map the attributes, the user clicks an attribute in the interface page 150B from the "Map From" list, whereupon the "Map From Message Name" and "Map From Message Field Name" fields are automatically filled. Alternatively, the user can type text in the "Map From Text" field instead of the "Map From Field Name" field. The user then clicks an attribute from the "Map To" list, whereupon the "Map To Message Name" and "Map to Field Name" fields are automatically filled. The user then clicks "Set". The user repeats this process until all of the "Map To" fields are mapped. In the portlet 152A (FIG. 7A) an assign variable icon 153 is provided to indicate the mapping status of each service. If all of the "Map To" fields for a given service are mapped, all of the blocks of the icon 153 will be connected by horizontal lines; otherwise some of the blocks in the icon 153 will remain disconnected. Finally, the user will click "Return."

The user may also set a condition that will determine whether a service will be invoked at run-time or not. The user can set a condition on an input parameter to a selected service so that the service will be started only when an input condition is met. This condition is a logical operation set on the value of an input attribute, or between the values of any two attributes. To make this setting, the user clicks a set condition icon 155 (in table 156; FIG. 7A), which opens the interface page 150C (FIG. 7C). The user then selects any parameter from the input messages listed on the left, whereupon the "Left Side Message Name" and "Left Side Field Name" fields are automatically filled. The user likewise selects a parameter from the input messages on the right and the corresponding fields are automatically filled. The user enters input in the right side text field, selects an operand, and finally clicks "Return" and then "Update".

Updating an existing process—In the portlet 152, the user selects the process definition to be updated from the "Defined Processes" pull down menu. The user can only update the status (enabled or disabled) of the process (by toggling the "Enabled" box), the description of the process (by revising the description in the "Description" field of portlet 154), and/or the services contained in the process. The services can be updated in any of the ways as described above with regard to creating a new process (e.g., the user can disable the status of a service, update the conditional definition, update the mapping, re-order the service or delete the service). Once the desired revisions have been entered, the user clicks the "Update" button of the portlet 152.

According to some embodiments, by design, the user cannot change the input message or the output message associated with the selected process. Also, according to some embodiments, once a process has been linked to a process point it is not possible to update it. The process must be first detached (i.e., disassociated or deleted) from the process point before it can be updated.

Deleting a process—In the portlet 152, the user selects "Modify an existing process" from the "Process Task" menu and selects the process definition to be deleted from the "Defined Process" pull down menu. The user clicks on the "Delete" button of the portlet 152 to delete the selected process.

The "Reset" button of the portlet 152 can be used to clear the portlet 152 (i.e., deselect a selected process or clear data from the data entry fields).

Figure 8A:
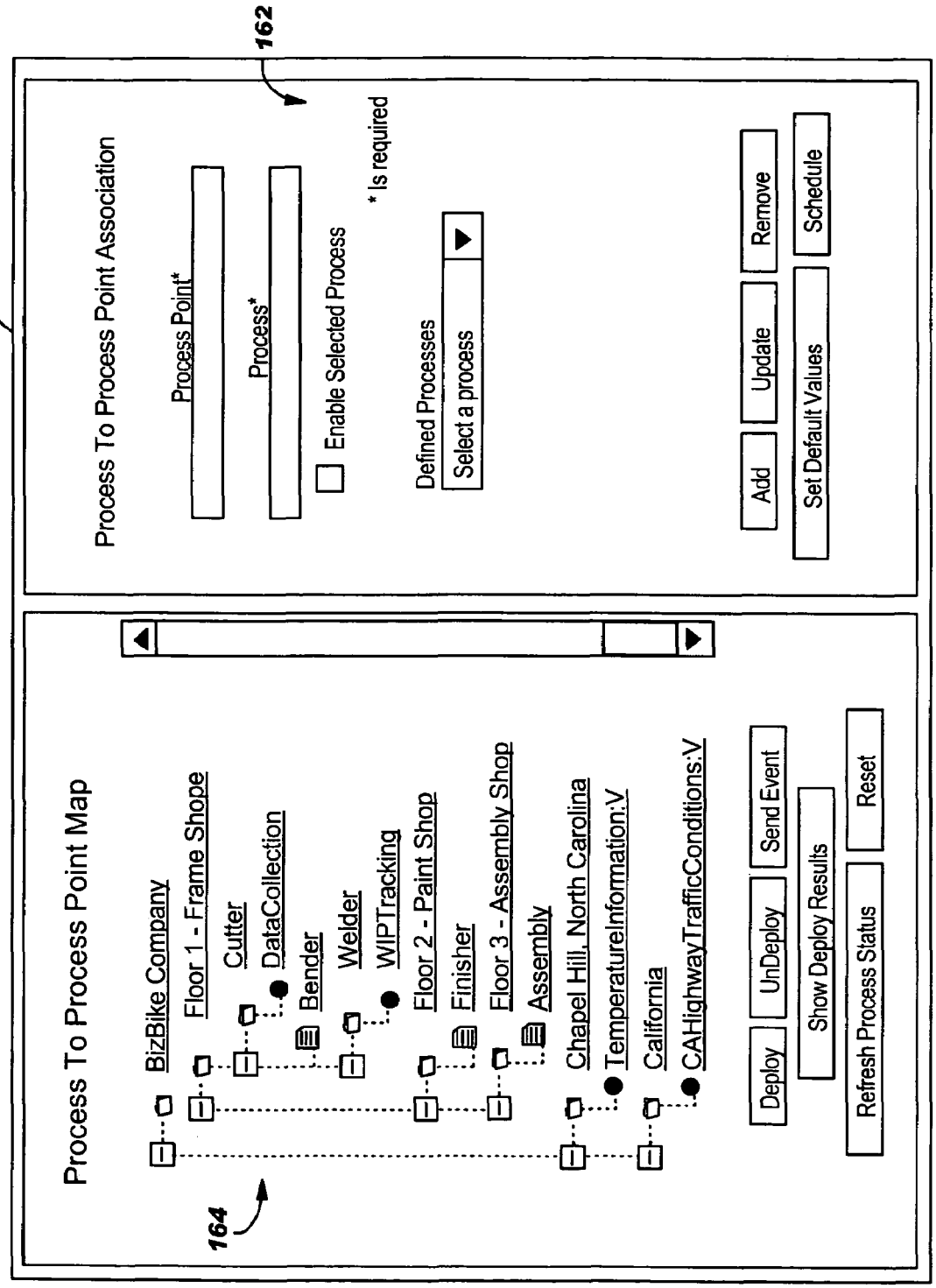

Referring to FIGS. 8A–8C, the process point configurator 39 allows the assembly line process points to be configured. The process point configurator 35 is used to associate process points with processes (to be invoked as a result of triggered events). This graphical representation can offer the flexibility to easily update or delete an existing process point configuration. Specifically, the process point configurator 39 provides a process point interface page to allow the associations between the process points and the processes to be performed at those process points to be defined.

Referring now to FIGS. 8A–8D, illustrative process point interface pages 160A, 160B, 160C, 160D are shown. The interface page 160 includes portlets 162 and 164. A line configuration tree is displayed in the portlet 164. The line configuration tree includes a listing of all of the process points of the line and all of the processes thus far associated with those process points. Using the interface pages 160A-

D, the configuring user will define all the processes that will occur at each process point. The interface pages 160A–D allow the following functions to be performed:

Defining/updating a process point configuration—In the line configuration tree of the portlet 164, a user clicks on the process point node to be configured to select that process point. The process point name will be displayed in the "Process Point" field of the portlet 162. The user then selects a process from the "Defined Processes" pull down menu in the portlet 162, thereby attaching or associating the selected process to/with the selected process point. The name of the process will be displayed in the "Process" field in the portlet 162. The processes listed in the pull down menu may include some or all of the existing processes previously configured using the process configurator 38. There may be multiple processes associated with a process point. Using the "Enable/Disable Process at Process Point" box in the portlet 164, the user can selectively enable and disable a process associated with a process point so that the process will not be executed at the process point by the run-time engine 20 even if the process is deployed to the run-time engine 20 and triggered by an event. The user can choose whether to enable or disable the process using the block in the portlet 132. The user then clicks "Add" and the chosen process will appear under the selected process point in the tree of the portlet 162.

The configuration steps discussed above occur in the build-time engine and a process associated with a process point will not automatically become executable in the run-time engine 20 at the process point until the process is deployed using the "Deploy" button. A previously deployed process can be undeployed (i.e., rendered non-apparent to the run-time engine 20) by clicking on the process in the tree of the portlet 164 and then clicking the "Undeploy" button.

The user may set default values for the input attributes of a selected process associated with a process point by clicking the "Set Default Values" button in the portlet 162. In response, the interface page 160B (FIG. 8B) is generated, wherein the user can assign default values for the input attributes of this process at this process point in the event the values of the attribute fields are not sent. In the interface page 160B the user then clicks each attribute for which the user wants to set a default value, types the new value in the "Default Value" field, and clicks the "Update Field" button. This new value will be used with this attribute at run-time only if it does not have a value assigned to it when it is received. If the user wishes to force the attribute to have this value at run-time, the user can check the "Override Event Value" box. Finally, the user clicks "Save Changes".

The user may schedule the process to be automatically triggered according to a schedule (e.g., at regular intervals) by clicking the "Schedule" button. In response, the interface page 160C (FIG. 8C) is generated, wherein the user can set the triggering schedule.

The user may also send a triggering event to the run-time engine for a selected process at the associated process point by selecting a process point and clicking the "Send Event" button in the portlet 164. This operation may used to for testing purposes, for example.

Deleting a process point configuration—The user clicks on a process attached to a process point node in the line configuration tree of the portlet 164 to select the process. The user then clicks on the "Remove" button in the portlet 162 to disassociate this process from the corresponding process point.

Broadly, and in summary, the user, via the configuration computer 12, creates or selects a working version of a line configuration using the version configurator 33. The user then designates process points in the line configuration using the tree configurator 35. The user then creates a catalog (or library) of input messages and a catalog of output messages using the message configurator 36. The user then creates a tree listing of service categories and a catalog (or library) of services using the services configurator 37, wherein each service is a Web Service and including specifying a URL from which to import a Web Service definition (e.g., WSDL document) for each service. The Web Service is imported via Internet transfer when the service is defined. The user next creates a catalog of processes using the process configurator 38, including defining the following for each process: a process input message, a process output message, a flow or sequence of services from the catalog of services, an input message for each such included service, and an output message for each such included service. This configuration of a process may include mapping the input attributes of an included service in the process flow from the process input message and/or from the output message(s) of any service(s) that are executed prior to said included service. This configuration of the process may also include the setting of conditions (logical operations based on input attributes values) that determine whether to invoke an included service at run-time or not. Then, using the process point configurator 39, the user assigns processes from the catalog of processes to the pre-designated process points. The system 10 also provides certain additional functionality as discussed herein via the process point configurator 39, such as the ability to: deploy or undeploy a process to the run-time engine; schedule a process to run automatically periodically; assign input default values to a process attached to a process point; and send test events to the run-time engine.

As the configuration procedure is being performed or thereafter, the configuration details (e.g., version, messages, services, processes, etc.) of the line configuration will be stored in one or more tables within the build-time storage unit 30 and/or the run-time database 21. Thus, the tables will include the process definitions and process-to-process point associations as needed to implement the line configuration. According to some embodiments, the configuration details are not loaded into the run-time database 21. However, according to other embodiments, some or all of the configuration details (e.g., the process definitions and/or the process-to-process point associations) are loaded into the run-time database 21. According to some embodiments and as described below, only the processes and the process points are loaded into the run-time database 21. Accordingly, the run-time database 21 will include the deployed process library but not the line configuration. The line configuration may thereafter be implemented as follows, with reference to an exemplary procedure.

An event is triggered at the process point 28A via the process point triggering device 26A (e.g., by the arrival of a vehicle at a specified process point). The event (or notification thereof) is communicated to the run-time engine 20 via the common device interface adapter 24A. The event notification includes various acquired data pertinent to the process to be executed at the process point. Typically, the event 4 notification will include an identification of the process point and the process to be executed (or alternatively, data from which the run-time engine 20 can determine the appropriate process). Upon receipt, the run-time engine 20 may consult the line configuration (e.g., by reference to the tables in the build-time storage unit 30 or in cached information in the memory of the ALCC 18 that has been obtained from the build-time storage unit 30) and confirm that it is proper (i.e., per the line configuration) to execute the process at the process point where the event was triggered. If confirmed, the run-time engine 20 refers to the process library in the run-time database 21 to determine the services and other configuration details of the requested process (i.e., the process definition). The run-time engine 20 then invokes the process by invoking the flow of services included in the process definition as provided in the run-time database 21. Invoking each service includes: calling the Web Service (which may be internal or external) corresponding to the Web Service definition imported for that service; sending the designated input message, which may incorporate the aforementioned acquired pertinent event data, to the Web Service; receiving the output of the employed Web Service; incorporating said output into an output message of the service; and providing the service output message as the output message of the process and/or as an input message to another service. The run-time engine 20 invokes the services of the process in sequential order. Thus, for example, event "A," could require process "B," which is comprised of services "B1, B4, and B6" (in that order), to be performed to address the event. Once the process for addressing the event has been identified, the run-time engine 20 will invoke the process (i.e., the services thereof). The process generates an output or reply message which is communicated back to the process point 28A, stored in the build-time storage unit 30, the run-time database 21 or another local database system, communicated to another system, or any combination thereof. The contents of the reply message are defined at configuration time and may be a combination of output attributes from all executed services. The working unit (e.g., the vehicle) may then proceed to the next process point.

By way of further example, a process point may be set up at a paint station of an assembly line so that when a vehicle arrives there, it is painted correct colors based on build-order information for the vehicle. When the vehicle arrives at this point, an event notification is sent to the ALCC 18 requesting the information required for processing of the vehicle to continue. The ALCC 18 receives the event, confirms from the build-time storage unit 30 that the process is correlated with the process point, and invokes the process bound to this process point and in response to an event. The flow of services forming the process are sequentially invoked by the ALCC 18. The services are implemented by either internal or external Web Services. In this example, the ALCC 18 retrieves the information about what color the paint should be from the Web Service(s). The ALCC 18 then sends a message back to the plant floor instructing a painting station to paint the vehicle the correct color and to pass the vehicle to the next process point. At another process point, the process may include reading a serial number of the vehicle, forwarding the serial number to a Web Service to determine the information to be printed on a corresponding shipping order, and sending a message back to the process point instructing a printer to print the corresponding shipping order with the appropriate information.

It should be appreciated that the teachings of the present invention could be offered as a business method on a subscription or fee basis. For example, the configuration computer 12 of FIG. 1 could be created, maintained and/or deployed by a service provider that offers the functions described herein for customers. That is, a service provider could offer to test a server environment of a customer by driving a load and analyzing the resulting performance as describe above. It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose configuration computer with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a configuration computer—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The build-time storage unit 30 and the run-time database 21 together form a storage system which may be modified in accordance with embodiments of the invention. According to some embodiments, the run-time database 21 is not used to store the process library in the run-time environment. Rather, the run-time engine 20 may refer to the table of the build-time storage unit 30 to retrieve the process definition information as well. Alternatively, according to further embodiments, the line configuration is also stored in the run-time database 21 so that the run-time engine 20 refers to the run-time database 21 for both process definitions and process-to-process point confirmations and the build-time storage unit 30 is not utilized in the run-time environment.

According to some embodiments, in order to deploy the processes (which may be referred to herein as "production processes") configured by the user via the process configurator 38, it is necessary to convert the corresponding metadata generated by the configuration system 14 to enabling code on the ALCC 18. According to some embodiments, the enabling code embodies corresponding executable business processes. According to some embodiments, the executable business processes are BPEL processes.

Normally, converting the metadata to the enabling code would require that the user use an integrated development environment (IDE) (e.g., the IBM WebSphere Studio Application Developer Integration Edition (WSAD/IE) toolset) to create executable business processes (e.g., BPEL processes) and to generate deploy code, after which they would cause the configuration computer 12 to deploy the executable business process. As part of this work, the user would also need to configure a communications channel such as a JMS listener so that the deployed executable business process could be invoked from an external application. This work may require programmer skills, J2EE application server skills (e.g., IBM WebSphere Application Server (IBM WAS) administrator skills), and/or other special skills.

According to embodiments of the invention, a dynamic executable business process generation and deployment method and system are provided that obviate the need for special skills or J2EE and administrator skills (e.g., WSAD/IE or IBM WAS skills) for the generation and deployment of executable business processes (e.g., BPEL processes), thus allowing a nonprogrammer to accomplish this in a friendly, higher level user interface, with a manufacturing context overlay, in the portal of the configuration system 14.

Moreover, according to embodiments of the invention, the dynamic executable business process generation and deployment method and system may provide certain additional functionality. The behavior of the executable business processes directed to enablement of the production processes or the various activities within the production processes can easily be defined in the configuration system 14. The user may be enabled to configure behavior in the portal of the configuration system 14 that will affect the behavior of the executable business process at run-time, such as whether or not a step (e.g., a Web Service) in the production process is currently enabled or whether the production process itself is enabled. Context specific default values such as the name of a printer for a portion of the manufacturing line can be applied at run-time. The generated executable business processes can be selectively deployed to more than one run-time application server based on the line configuration defined in the configuration system 14. The executable business processes can be instrumented to support centralized viewing of process status in the portal of the configuration system 14 (e.g., by logging into a centralized solution manager forming a part of middleware software, such as IBM's Middleware Solution for Automotive Production (MSAP) on the run-time application server). The executable business processes can be instrumented to support recovery of failed processes in the configuration system 14 portal.

Figure 9:
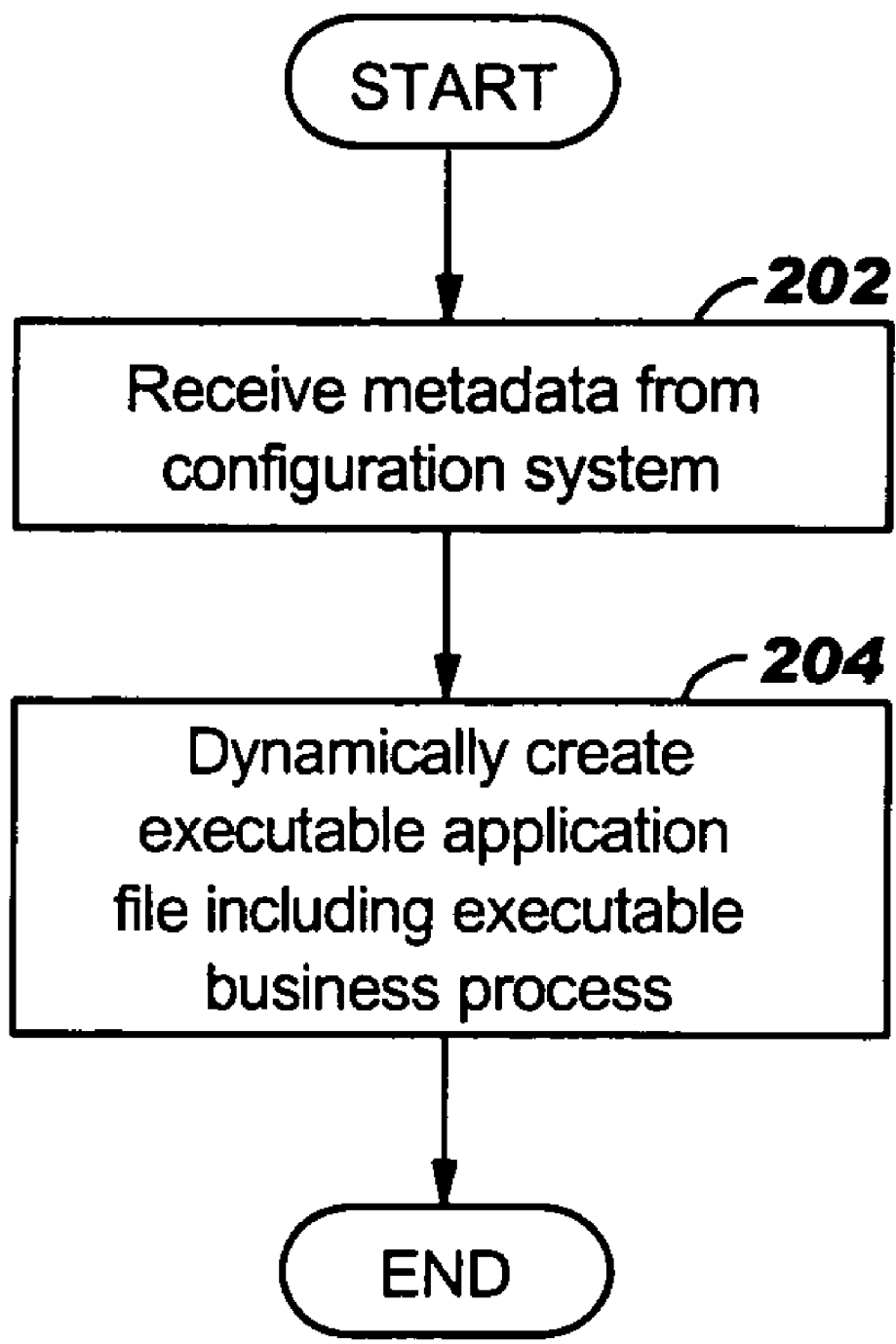
FIG. 9 is a flow chart illustrating methods in accordance with an aspect of the present invention for implementing a production process.

With reference to the flow chart of FIG. 9, computer-implemented methods according to embodiments of the present invention for implementing a production process are illustrated therein. Metadata representing the production process is received from a configuration system (Block 202). An executable application file based on the metadata is dynamically created (Block 204). The executable application file includes an executable business process. By "dynamically created", it is meant that the executable application file is automatically and programmatically created using computer code. According to some embodiments, the executable application file is dynamically created based on the metadata without human intervention. According to some embodiments, the executable business process is a BPEL process. According to some embodiments, the executable application file includes (or is) an Enterprise Archive (EAR) file. According to some embodiments, the step of creating the executable application file includes generating an executable business process record (e.g., BPEL record) based on the metadata, and thereafter converting the executable business process record to the executable application file.

The dynamic executable business process generation and deployment methods and systems of the present invention will now be described with reference to embodiments wherein the executable business processes are BPEL processes. However, in accordance with other embodiments of the invention, the executable business processes can be non-BPEL executable business processes, such as Flow Definition Markup Language (FDML) executable business processes.

The system 10 or any other similar or suitable system for configuring and implementing an assembly line may employ a dynamic BPEL process generation and deployment method and system as just described in accordance with embodiments of the present invention. Generally and with reference to FIG. 10, the dynamic BPEL process generation and deployment system retrieves from the configuration system metadata representing a process of the line configuration (which may be referred to herein as "production processes"), generates a BPEL process from the metadata, creates an executable application file such as an Enterprise Archive (EAR) file, and installs the EAR file on the assembly line control computer. The EAR file is operative, when called, to execute the step(s) of the production process, which may include invoking one or more Web Services included in the production process. The EAR file may be called by and report process results to an event interface application. The dynamic BPEL process generation and deployment method and system are discussed in more detail below.

Figure 10:
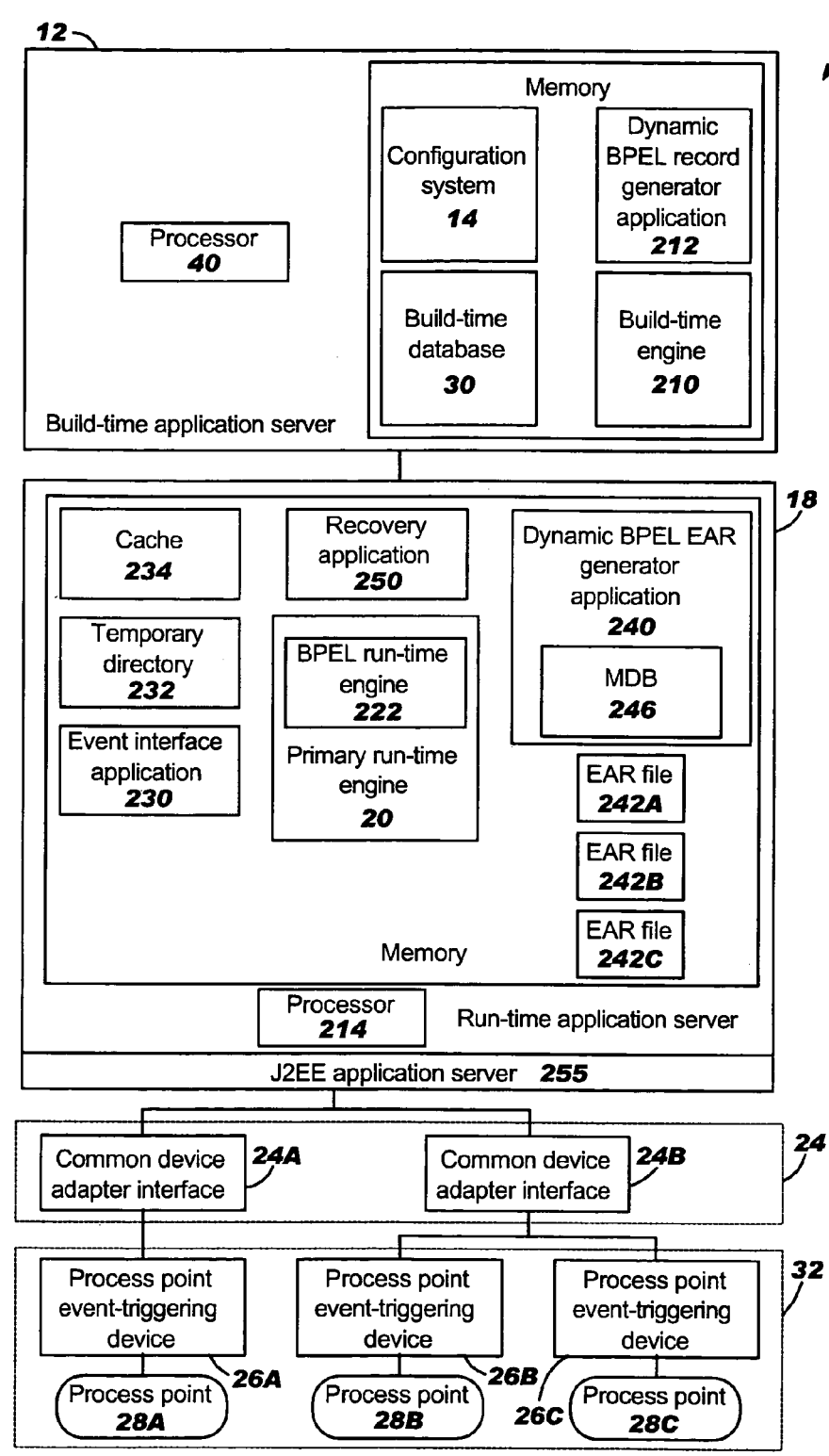
FIG. 10 is a depiction of the configuration system of FIG. 1 including further detail.

With reference to FIG. 10, a modified block diagram of the system 10 is shown therein. For the purposes of discussion, the modified view illustrates certain components of the system 10 in more detail and others in less detail than shown in FIGS. 1 and 2.

As shown in FIG. 10, the configuration computer 12 (which may also be referred to as the build-time application server 12) includes in its memory 42 the assembly line configuration system 14 and, additionally, the build-time database 30, a build-time engine 210, and a dynamic BPEL record generator application 212.

The ALCC 18 (which may also be referred to as the run-time application server 18) includes a processor 214 and a memory including the run-time engine 20 (which may be referred to as the primary run-time engine 20), a BPEL run-time engine 222 residing on the primary run-time engine 20, an event interface application 230, a temporary directory 232, a run-time memory or cache 234, a dynamic BPEL EAR generator application 240, EAR files 242A, 242B and 242C. Middleware such as a Java-based (e.g., J2EE) application server 255 is provided between the ALCC 18 and the common device adapter interfaces 24A-B (collectively, an input/output interface 24) which provides the links to the manufacturing line 32. Suitable middleware may include IBM WebSphere Application Server V6.0 (IBM WAS).

In use, the user configures one or more production processes using the GUI of the line configuration system 14 as described above. That is, the user attaches a production process to a process point. The line configuration system 14 generates metadata representing the production process and stores this metadata in the build-time database 30. The metadata in the build-time database 30 may be altered, refreshed or updated as the production process is configured using the configuration system 14, as additional production processes are configured using the configuration system 14, as existing action steps in the production process are changed, and/or new action steps are added. An action step may be a Web Service call to perform some functionality. The metadata will also change as mapping of input variables for the action steps are altered.

The user then sends a deploy request as described above using the configuration system 14. Responsive to the deploy request, the BPEL record generator application 212 retrieves the production process metadata from the build-time database 30 and programmatically converts the metadata to BPEL records as described below. Each BPEL record corresponds to a configured production process and includes a specially constructed BPEL file. Each BPEL record also includes partner WSDL definition files that each describe a Web Service that is to be invoked in the production process (e.g., there is one WSDL definition file per action step (e.g., Web Service) in the production process), one WSDL file for the entire BPEL process (which describes the input/outputs of the BPEL process), one WSDL interface file that the BPEL process refers to that identifies all other WSDL files used (i.e., BPEL process WSDL files and individual partner WSDL files), one component file per partner WSDL definition file and BPEL process WSDL file that provides the namespace and port/service linkages with the BPEL file, and one options file to describe how the BPEL EAR is to be installed and the partner link endpoints.

Turning to the BPEL files in more detail, the BPEL record generator application 212 translates the metadata for each production process into a corresponding BPEL file. The following are generated for the BPEL file. The BPEL record generator application 212 generates the definition of the BPEL process input message (i.e., the input message to the BPEL process) and the BPEL process output message (i.e., the output message from the BPEL process) and global variables, defines all namespaces for all actions (e.g., Web Services), and defines all partner link services endpoints. The BPEL record generator application 212 also defines a BPEL process workflow as described below. It will be appreciated that the following description applies to each BPEL file created by the BPEL record generator application 212.

The BPEL record generator application 212 also supplements the BPEL process input message definition with additional fields embodying data attributes beyond those defined by the user (i.e., additional to the metadata). A unique event identification number (EIN) attribute is added to the BPEL process input message definition. The EIN is ultimately used for logging purposes in run-time. The EIN corresponds to the BPEL process that is invoked when an event is received. It will be the link between separate and distinct log entries that are sent and persisted by the recovery application 250.

A restart step number attribute is added to the BPEL process input message definition also. The restart number is used to designate and register the action or service step to begin with in re-execution in case a process is not successfully completed. By default this number will be zero, meaning that re-execution will begin at the first step of the production process.

An attribute including a string of Boolean values is added to the BPEL process input message definition also. The string includes a value for each service to indicate whether that service is currently enabled or disabled (per the process configuration represented in the metadata currently being deployed). The enabling and disabling of an action step is dynamic and can change from one process execution to the next. For example, a printer jam may cause an action step C to fail so that the user disables that step in the process using the GUI of the configuration system 14. The string representation would then be "1;1;0;1;1", where steps A, B, C, D, and E are enabled and step C is disabled. When the printer is fixed, the user will re-enable step C, and the string representation would then be "1;1;1;1;1".

The BPEL record generator application 212 also supplements the BPEL process output message definition with additional fields embodying data attributes beyond those defined by the user (i.e., additional to the metadata). An error code attribute is added to the BPEL process output message definition. In run-time, the error code attribute will contain any error codes captured and returned by the BPEL process.

An error reason attribute is added to the BPEL process output message definition. In run-time, the error reason attribute will contain a string representation of the error code in the event an error is captured and returned by the BPEL process.

The BPEL record generator also generates and includes in the BPEL file logic code that is additional to that representing the metadata from the process configurator, as follows.

The BPEL file will include code enabling the BPEL process, in case of a process that fails to complete and is reinitiated by the recovery application 250, to first determine the restart number of the last logged input message for the BPEL process. The restart number is, on restart, the last step in the process that executed successfully and the next step the process is to restart upon. If the restart number is greater than zero, the recovery application 250 will reinitiate the BPEL process starting with the step (i.e., Web Service or other action within the process) that consumed the last logged input message.

The BPEL file will include code enabling logging to the recovery application as follows so that the logged information can be made available for re-execution of a failed process. Before each action step (which may be a Web Service) to be executed (and only if that step is to be executed), the BPEL process code will log the input message data content of the BPEL process input message (along with the EIN) to the recovery application 250. After each step, the BPEL process code will log the BPEL process output message data content of the output message (along with the EIN) for the step that was executed (and only if that step was executed) to the recovery application 250.

The BPEL file will further include code to enable the BPEL process to log an error and any associated data from any service to the recovery application 250. Error logging includes filling in the error code and error reason fields of the BPEL process output message with either error codes, in case of an error, or with zero and "success" if there is no error.

After the BPEL record generator application 212 generates the message definitions and logic of the BPEL files as described above, the BPEL record generator application 212 sends the BPEL records via Java Messaging Service (JMS) to the run-time application server (in the illustrated example, the run-time application server 18) that corresponds to the active version of metadata information in the configuration system 14. Each version can be assigned to point to a different run-time application server so that the production processes thereof will be deployed to the selected run-time application server.

The BPEL records are received by the dynamic BPEL EAR generator application 240 via suitable interfaces. As discussed in more detail below, the BPEL EAR generator application 240 and the J2EE application server 255 will generate source code and executable code from the BPEL and component files, install the code as the BPEL EAR files 242A–C on the run-time application server 18, and start the application (i.e., the production process defined in the configuration system 14, rendered as a BPEL record and then converted to an EAR file 242A–C).

The BPEL records are saved in the temporary directory 232 on the run-time application server 18. As discussed above, for each BPEL record, one WSDL definition file and one component file are created per partner link Web Service. The array will have as many entries as there are Web Service actions in the BPEL process. These objects are saved as an array that will vary in size depending on the number of Web Services (and, hence, partner links) included in the BPEL process definition. The following discussion will describe the procedure for creating an EAR file 242A for a given one of the BPEL records. Further BPEL records may be converted in the same manner to create respective additional EAR files 242B, 242C, etc. That is, each BPEL record will make one EAR file for one production process defined in the configuration system 14. Each production process will be generated as its own set of records (i.e., BPEL record) that will be converted to its own EAR file.

The set of BPEL/WSDL files for the BPEL record to be converted is then sent as a JMS object message from the temporary directory 232 to a Message Driven Bean (MDB) 246, which is a JMS message listener running on the run-time application server 18. According to some embodiments, the MDB 246 is a part of BPEL EAR generator application 240 and listens for requests to create and install BPEL EAR files on the application server 18 or to uninstall those BPEL EAR files. The JMS object message includes a process template name. The process template name is generated by the BPEL record generator application 212 as part of the process that generates the set of BPEL/WSDL files and represents the EAR file name (i.e., the application executable name) as well as the process template name. The process template name is based on the name generated for the production process in the configuration system 14 and stored in the configuration system's 14 metadata (i.e., in the build-time database 30). According to some embodiments, the process template name is the production process name (i.e., as assigned using the process configurator 38 (FIG. 2) by the user) concatenated with the name of the run-time application server 18.

The MDB 246 reads the object message and creates a process directory (which may be saved under the temporary directory 232) indexed by the process template name and the files represented by each array element (i.e., file name, file content).

The MDB 246 then builds a run-time "deployBPEL" command, which is a Java Application Control Language (JACL) command (i.e., JACL script) and may be provided by the J2EE application server 255. The MDB 246 then writes the "deployBPEL" command to the process directory. The MDB 246 then executes the system command via the Java interface (in the MDB 246), which deploys (i.e., submits) the BPEL process to the J2EE application server 255. The J2EE application server 255 converts the BPEL file, the WSDL file(s) and the option file(s) into an EAR file. More particularly, the J2EE application server 255 executes the "deployBPEL" command JACL script to automatically programmatically generate and compile the computer readable program code of the EAR file. The J2EE application server 255 may place this code in a temporary directory. The J2EE application server 255 then loads/installs the code onto the run-time application server 18 as the EAR file 242A. The EAR file 242A may contain Enterprise Java Beans (EJBs).

The MDB 246 then gathers the results from the execution of the JACL deployBPEL command and returns this information to the BPEL EAR generator application 240 to interpret. The MDB 246 displays the results of the deployment attempt to the end user at the configuration system 14. The display may serve to inform the user that either the deployment was successful or it was not successful, and to indicate the reason if it was not successful. The MDB 246 will deploy the BPEL process to all process points to which the process is attached or mapped. Thus, deploying the process for any one of the process points will make the process (i.e., the application executable EAR file) available for all process points that may invoke that process with an event.

If the deployment was successful, the BPEL EAR generator application 240 updates the metadata in the build-time database 30 to reflect that the production process has been deployed successfully.

Each generated EAR file 242A–C is an executable process application file that, when run, will execute a configured production process in accordance with the process configuration provided by the user at the GUI of the configuration system 14. The EAR file consists of a number of files or components that are embedded directly in the generated EAR file and may also be retained on the temporary directory 232. These files include the following:

i. The WSDL definition file for each partner link service (i.e., Web Service)—The WSDL definition file may also be referred to as a "WSDL document" or "Web Service definition." The WSDL definition file defines how to call the Web Service, the protocol, the formats and types of the input messages and output messages, exceptions that may be thrown (optional), and the URL to call the Web Service with. The WSDL definition file itself is copied by the BPEL record generator application 212 from wherever it resides as defined by its URL in the metadata from the configuration system 14 and is sent with the BPEL file and other files to eventually be embedded in the generated EAR file 242A–C.

ii. The BPEL file—There will be one BPEL file for each EAR file 242A–C. The BPEL file defines workflow process, mappings, etc. as described herein.

iii. The BPEL process WSDL file—This file defines the input and output messages for the endpoints of the BPEL process. The BPEL process WSDL file also defines the "sequential" BPEL process operation, which is the only operation of the BPEL process. The BPEL process WSDL file imports (from the metadata from the configuration system 14) and links all other WSDL files used in the production process.

iv. A component file corresponding to each WSDL definition file—This file serves as linkage between the individual partner link WSDL definition files and the BPEL process options file so that the generated EAR file will know which WSDL file describes the Web Service it wants to invoke (e.g., its input/output message calling URL, etc).

v. The WSDL interface file—The WSDL interface file ties all of the WSDL definition files together and makes them available to the BPEL file that needs their location (for the BPEL process) and needs to use those WSDL definition files on Web Service calls.

vi. The JACL script used to create EAR files from WSDL files, BPEL file, and component files.

vii. An options file for the JACL script—The options file defines options for the BPEL process generation and installation.

Following the loading of the EAR file 242A onto the run-time application server 18, the user can send a refresh event to the event interface application 230 via the configuration system 14 (e.g., using the "Refresh Process Status" button on the interface page 160A (FIG. 8A)) immediately or later (e.g., after the end of the manufacturing shift) to instruct the event interface application 230 that the new production process is available and to start servicing the new production process. The refresh event causes the event interface application 230 to refresh its cache (i.e., retrieve current configuration metadata from the build-time database 30 and store it in the cache 234). In addition to process-to-process point mapping metadata, the refresh data may include information about the production processes and their input/output messages and defaults and whether a production process or action/service in a process is enabled or disabled. By "start servicing the process" it is meant that the event interface application 230 will accept requests that come for the production process at a particular process point that the production process is mapped to in the configuration system 14. The event interface application 230 will accept those production processes and the data that matches the input record for the process while augmenting the data with any defaults. The event interface application 230 will then call the BPEL run-time engine 222 to request that the BPEL run-time engine 222 call the EAR file 242A of the corresponding BPEL process.

In practice, a production process can be implemented as follows. An event is sent to the event interface application 230. The event interface application 230 matches or confirms match of the process to the process point using line configuration data from the cache 234. The event interface application 230 builds and sends an input message to the BPEL run-time engine 222, which forwards the input message to the appropriate EAR file 242A corresponding to the process definition. The BPEL process defines what to call and how the data mappings/transformation should occur. If default values are required, these are provided (in the process input message) by the event interface application 230. The called EAR file 242A runs through the process and generates an output message that is sent back to the event interface application 230 via the BPEL run-time engine 222. The generated code provided in the EAR file 242A may use, for example, Web Services Invocation Framework (WSIF) or Java API for XML-based RPC (JAX-RPC) or any API that implements service oriented architecture (SOA) to make dynamic Web Service calls to the external Web Services and wait for the responses. The WSDL definition files for those Web Services describe how and where to call those Web Services and what data is expected by the Web Service and what data will be returned by the Web Service.

According to some embodiments, the EAR file 242A will execute the following steps in accordance with the BPEL process workflow defined by the BPEL record generator application 212:

a. The original input message from the event interface application 230 is received by the EAR file 242A;
b. For each individual action step, the following tasks are executed:
  i. The input from the event interface application 230 is tested to see if the requested step is disabled or to be skipped;
  ii. If the requested step is to be executed, the start of the action step is logged;
  iii. If the requested step is to be executed, the input message variables are mapped for this Web Service action with the data that came from a field in the original input message or from the output message of a previous Web Service that has been executed in this process workflow or static data as defined in the metadata of the build-time database 30. Any appropriate data transformation will be accomplished if data types differ (e.g., between input variable field and what is being mapped into that field);
  iv. If the requested step is to be executed, the Web Service will then be invoked;
  v. If the requested step is to be executed, the output from the Web Service call will then be logged;
  vi. If the requested step was not to be executed and the current cycle is a resume/recovery cycle, the global variable that defines this Web Service action will be populated with data from the error recovery utility via the event interface application 230; and
c. The whole BPEL process can be wrapped in a global error handler to catch any faults and handle them gracefully.

As mentioned above, each step may be tested to see if the step should be skipped on recovery of the BPEL process. A step may need to be skipped because to re-execute it may cause harm (e.g., to send an email that already was sent on a previous failed process or reprint install instructions on the manufacturing floor). If the step is skipped, it is desirable to populate the skipped step's output with the original data from the process that failed (after this skipped step completed in failed process) or with data entered by the user restarting the process. The output record should be populated as described because a step later in the restarted process may depend on the output of the skipped step as its input when it is started, and if the output field were empty that may cause an error.

A BPEL process as described above can be uninstalled (i.e., undeployed). For example, the user may request that a selected production process (for which an EAR file 242A exists on the run-time application server 18) be undeployed using the process point configurator interface page 160A (FIG. 8A). The undeploy request is sent by the configuration system 14 via the BPEL record generator application 212 to the MDB 246. In response, the MDB 246 will uninstall the corresponding EAR file 242A by submitting an uninstall command (e.g., suitable JACL script) included in the EAR file 242A to the J2EE application server 255, where the command is executed.

If the production process needs to be redeployed, it can be regenerated from the GUI metadata in the build-time database 30 in the same manner as described above.

In accordance with embodiments of the present invention and as discussed above, the system 10 may be adapted to provide data logging and error recovery of failed events (and the associated failed executable business processes). As used herein, a "failed event" refers to an event that triggers a process that is not completed. The failed event may have been generated from the floor (e.g., one of the process point event triggering devices 26A–C (FIG. 1)) or from the recovery application 250 (FIG. 10). The system may enable the user to modify, restart, and/or resume a failed process from a portal by sending a new event to the process engine from a recovery utility rather than from the plant floor. That is, the process can be retriggered (with or without modification) without having to generate a new event from the plant floor.

Figure 11:
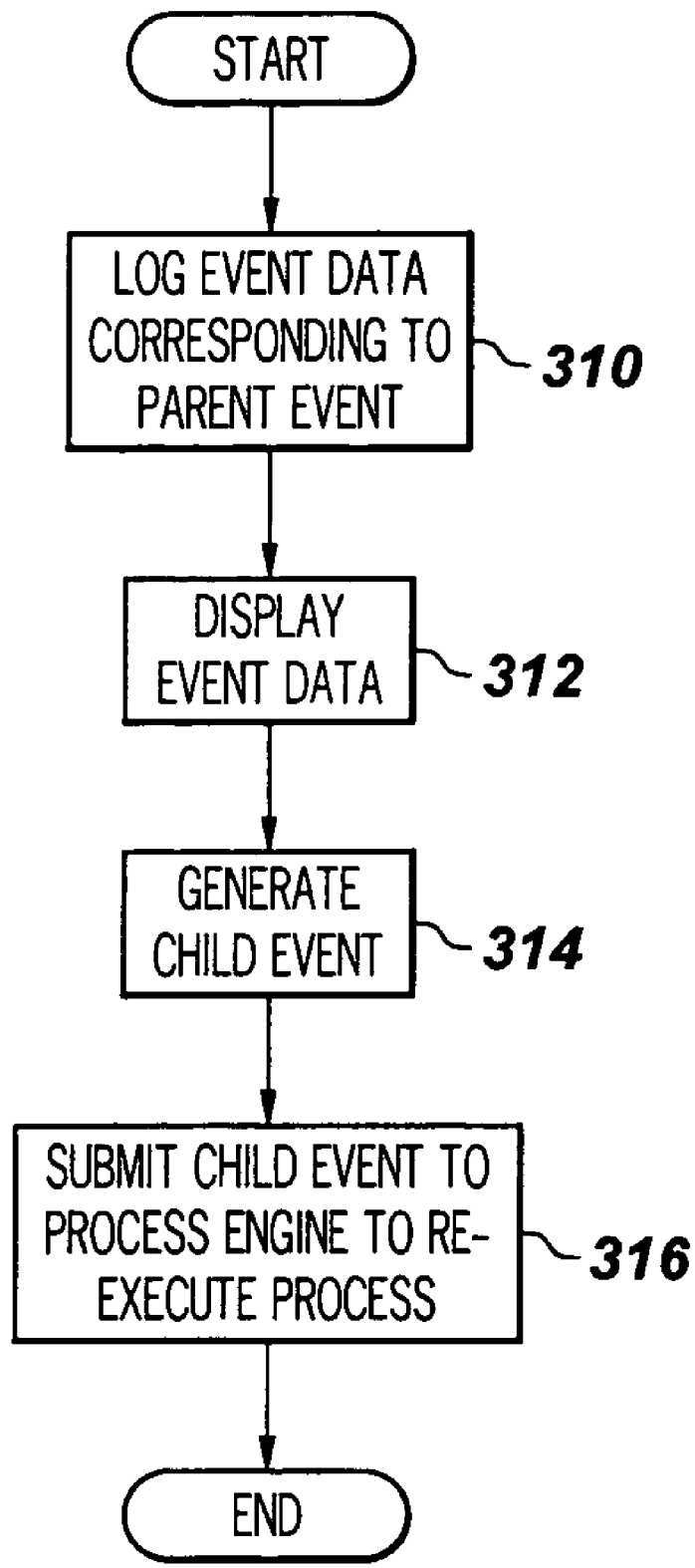
FIG. 11 is a flow chart illustrating methods in accordance with an aspect of the present invention for implementing a production process.

With reference to FIG. 11, computer-implemented methods according to embodiments of the present invention for implementing a production process are illustrated therein. Event data corresponding to a parent event that has triggered an executable business process that has failed is logged (Block 310). The event data is displayed to a user (Block 312). Responsive to input from the user, a child event is generated based on the event data (Block 314), and the child event is submitted to a process engine to initiate re-execution of the executable business process in accordance with the child event (Block 316).

In accordance with some embodiments of the present invention, methods, systems and computer program products include or implement mechanisms for converting a non-restartable executable business process into a restartable executable business process (according to some embodiments, a BPEL process) by instrumenting the process and providing necessary logic. As discussed below, the mechanisms may include a mechanism for sending process input data and a restart sequence number from a recovery utility to an event interface application or engine for execution/dispatch. The recovery utility may be operated via a GUI and the process input data may be altered by a user via the GUI before being submitted to the event interface engine. The event interface engine gathers the restart information and forwards it through a generic interface to the executable business process file (according to some embodiments, a BPEL file) as configured/hidden parameters. The generated BPEL process has built-in logic to handle a resubmitted process from the beginning, or at any service or action step within the process. The foregoing components may facilitate dynamic control of the executable business process recovery/submission by further providing support for viewing of process status, executed services, results of executed services, and correlated service informational messages in an application log. The components may also provide user interface support for restart, resumption, or clearing (or conclusion) of failed events, including: the ability to change executable business process input elements; the ability to select any service within the executable business process to start from; and the ability to trigger a restart and/or resumption of a failed executable business process.

Embodiments of the present invention providing for data logging, data display, and error recovery will now be described with reference to FIGS. 12–19. Generally, the event interface application 230 (FIGS. 10, 12 and 13) of the system 10 logs all incoming production events and messages. A log retrieval application 350 and a log portlet application 352 provide the ability to retrieve logged messages and display them on a user's screen. The system 10 also provides the user with the capability to re-submit failed events via a suitable interface. According to some embodiments, the user interface is a graphical user interface. A failed event can be cleared, resumed or restarted. Each of these options may be available from a user's screen for each failed event. The implementation and additional features of the data logging, data display, and error recovery functionality are described in further detail below.

Figure 12:
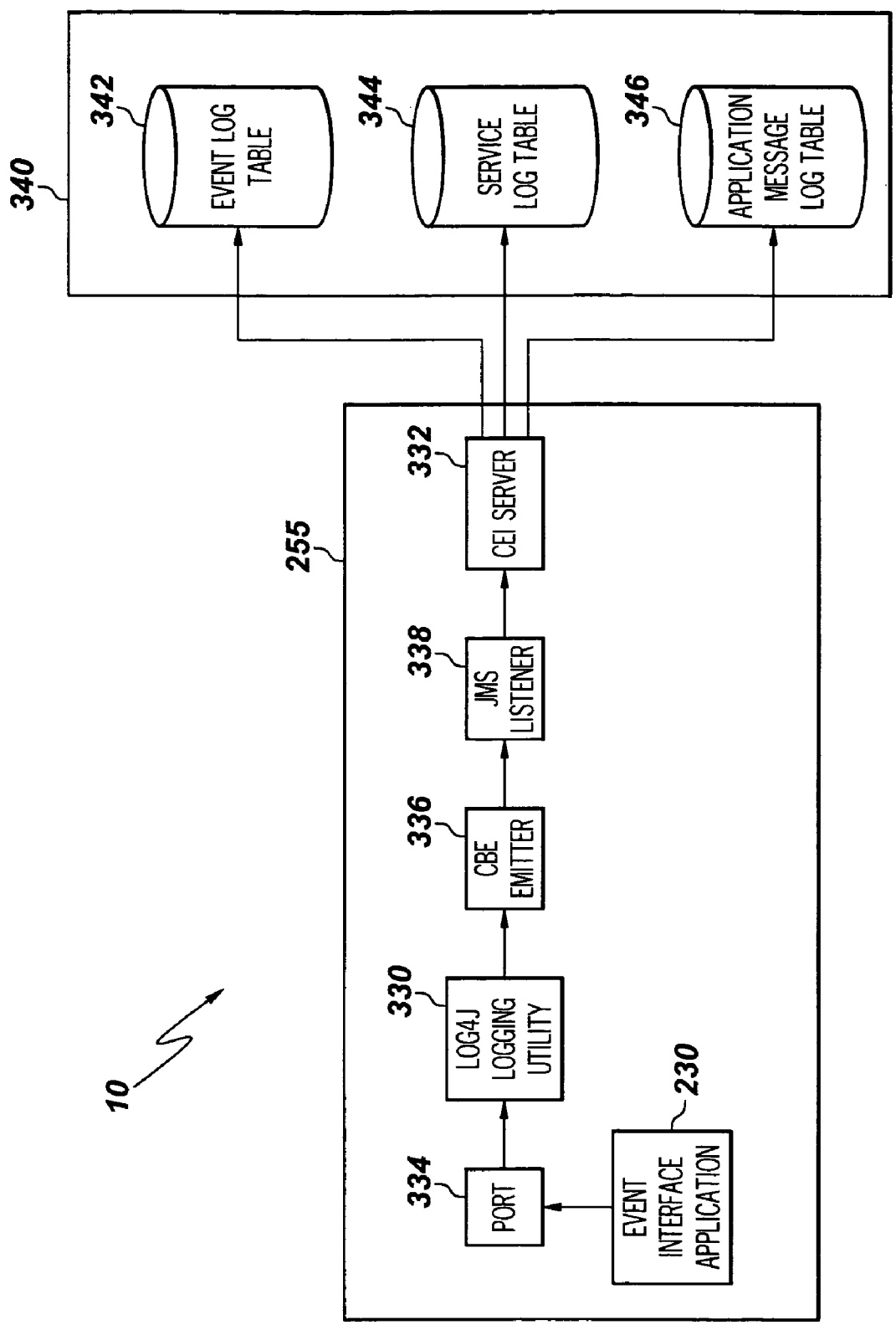
FIG. 12 is a depiction of a computer software architecture for implementing the methods of FIG. 11 according to an aspect of the present invention.

A data logging architecture of the system 10 is depicted in FIG. 12. The system 10 logs the following messages:

1) Production events triggered from plant floor production lines (e.g., by the devices 26A–C; FIG. 1);
2) Resubmitted events generated by the recovery application 250 and handled by the event interface application 230 (FIGS. 10, 12 and 13);
3) Service messages invoked as a result of incoming log requests from external systems; and
4) System messages such as portal initiated transactions or messages initiated from external systems such as those for receiving orders.

For each event the event interface application 230 handles, the event interface application 230 will generate a log request or message at entry and exit of the corresponding executable business process. The log request includes an "EventData" field, which contains the input message on entry log requests and the output or error message on exit log requests. The BPEL file invoked responsive to the event and operative to execute the executable business process will have a Java snippet code block before and after each Web Service (or other partner link) invocation. Before each invocation, the input message for that Web Service will be logged and after each step the output message of that successfully executed Web Service is logged. While the entry and exit messages for each Web Service are logged, only the Web Service exit messages and the original input of the parent event message from the event interface application 230 are necessary to restart and reconstruct the BPEL process.

The architecture components of the data logging solution as depicted in FIG. 12 provide the following functionality. According to some embodiments, the system 10 uses Common Event Infrastructure (CEI) for the data logging and retrieval of messages. The CEI is IBM's implementation of a consistent, unified format for the creation, transmission, persistence and distribution of a wide range of business, system and network events, based on the Common Base Event (CBE) format, and defines a standard format for event logs that devices and software use to keep track of transactions and other activity. The CBE format is an XML and Web Services based construct for exchanging problem determination data.

The CEI embedded interfaces generally fall into one of the following categories. First, the CEI Event Submission Interfaces (embodied on one or more "log request sources") allow applications to create and send log requests to a CEI management server. Second, the CEI Event Subscription Interface(s) (embodied on one or more "log request servers") allow(s) applications to subscribe to particular types of logs as they arrive in "real time" at the CEI server. Third, the CEI Event Query Interface(s) (embodied on one or more "log request servers") allow(s) applications to query historical log request information from a CEI data store. In the context of CEI architecture, the "log requests", "log request sources" and "log request servers" referred to herein may be commonly referred to as "events", "event sources" and "event servers", respectively; however, the former terms are used herein to avoid confusion with the process trigger "events" otherwise referred to herein.

In the embodiment as illustrated in FIG. 12, the log request source is a Log4J logging utility 330 and the log request server is the CEI server 332. The Log4J logging utility 330 receives log requests or messages from the event interface application 230 and potentially other log request sources via a specified port 334. The Log4J logging utility 330 has an appender that converts the log request details from the event interface application 230 into the CBE format and calls a CBE server emitter 336. The CBE formatted log request or message will include a type tag placed thereon by the Log4J logging utility 330 based on data provided by the log request source (e.g., the event interface application 230). The CBE emitter 336 delivers the CBE formatted log request to the CEI server 332 via a JMS listener data logging Message Driven Bean (MDB) 338 for logging the log request. The CEI server 332 logs each log request into an appropriate one of an event log database table 342, a service log database table 344, and an application message log database table 346. The log request is logged according to its type tag. The tables 342, 344, 346 may reside on a database server 340.

The data logged in the event log table 342 may include, for each logged event: an eventid; an "event" log type; an event state (e.g., in progress, success, or error); an actor (i.e., an identification of the operator or system that triggered the event); an event time (i.e., time of the trigger); a log time stamp; event data (i.e., an input message representing the event, which may be the same as the process input message or essentially the same except that duplicate information such as header attributes (e.g., event source, event name, etc.) are removed); a parent eventid (if any); an event name; an event source (e.g., a location in the assembly line); and/or an event server. There may be multiple back end servers and/or event interface applications that could have processed the event and the event server data enables the recovery message to be sent back to the same event interface application/server that fielded it.

The data logged in the service log table 344 may include, for each service or action of an executable business process: a sequence number (i.e., the position of the service in the order of the process); a log type (e.g., entry or exit); an action or service name; a log time stamp; and/or an eventid (which correlates the service or action back to the event log).

The data logged in the application message log table 346 may include various data related or not related to a business process, including: an application name; a message ID; an error code (if any); a log time stamp; a method name; a userid (if any); and/or a level.

Additionally, when the CEI server 332 receives a log query request, it retrieves the log information from the appropriate database table and returns it to the requestor (e.g., the recovery application 250 or the log retrieval application 350 as discussed below).

Figure 13:
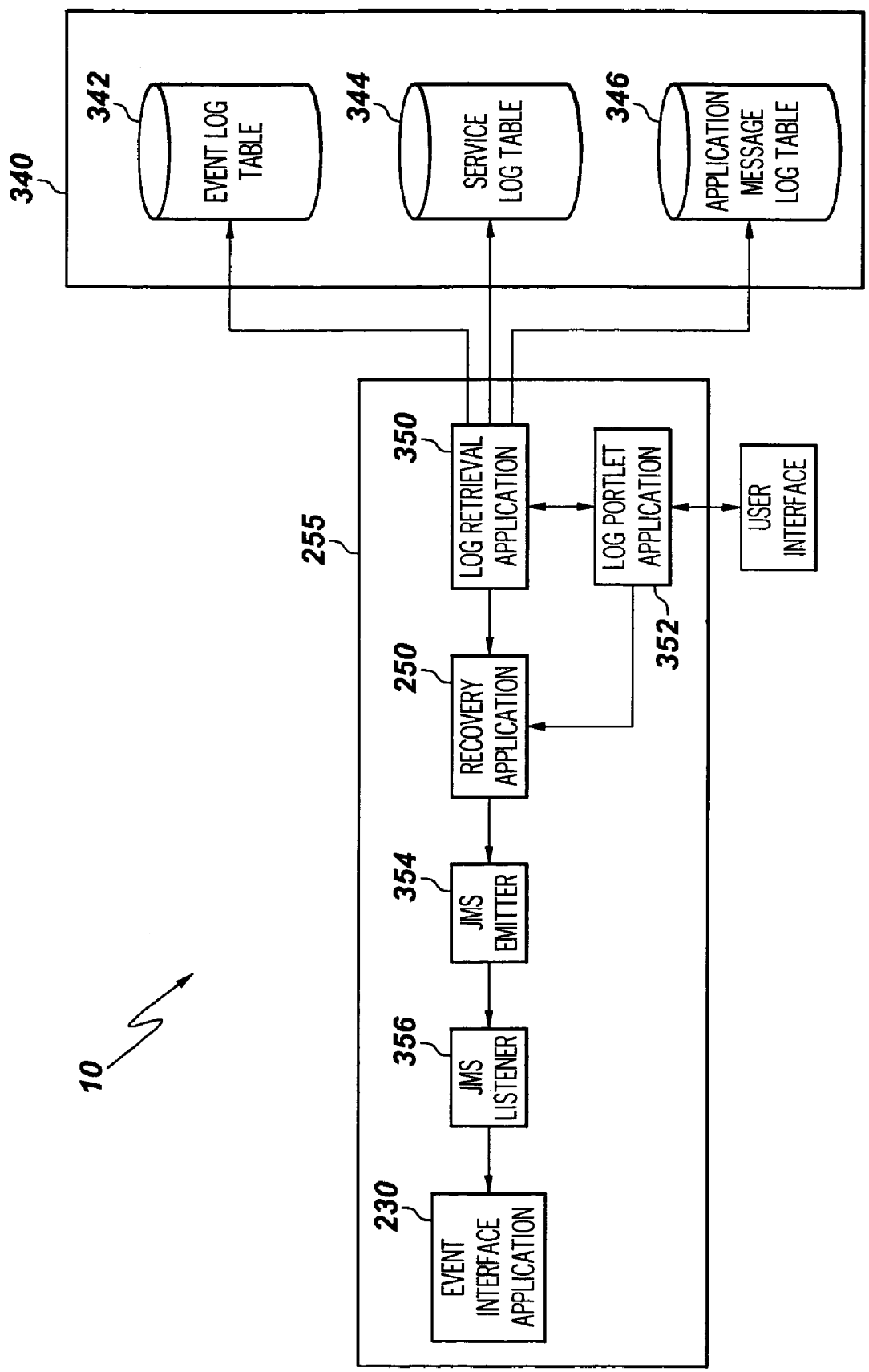
FIG. 13 is a further depiction of the computer software architecture for implementing the methods of FIG. 11 according to an aspect of the present invention.

Referring to FIG. 13, a data and error recovery architecture of the system 10 in accordance with some embodiments of the invention is shown therein. The system 10 includes the log retrieval application 350, which retrieves logs from the log tables 342, 344, 346, and a log portlet application 352, which displays interface pages such as GUI portlets to the user. As discussed below, the portlets may be used to request and display log data (including error and non-error information) and to clear, modify and/or resubmit events. The recovery utility or application 250 receives messages from the log retrieval application 350 and the log portlet application 352. The event interface application 230 receives messages from the recovery application 250 via a JMS emitter 354 and a JMS listener 356 as discussed below.

Figure 14:
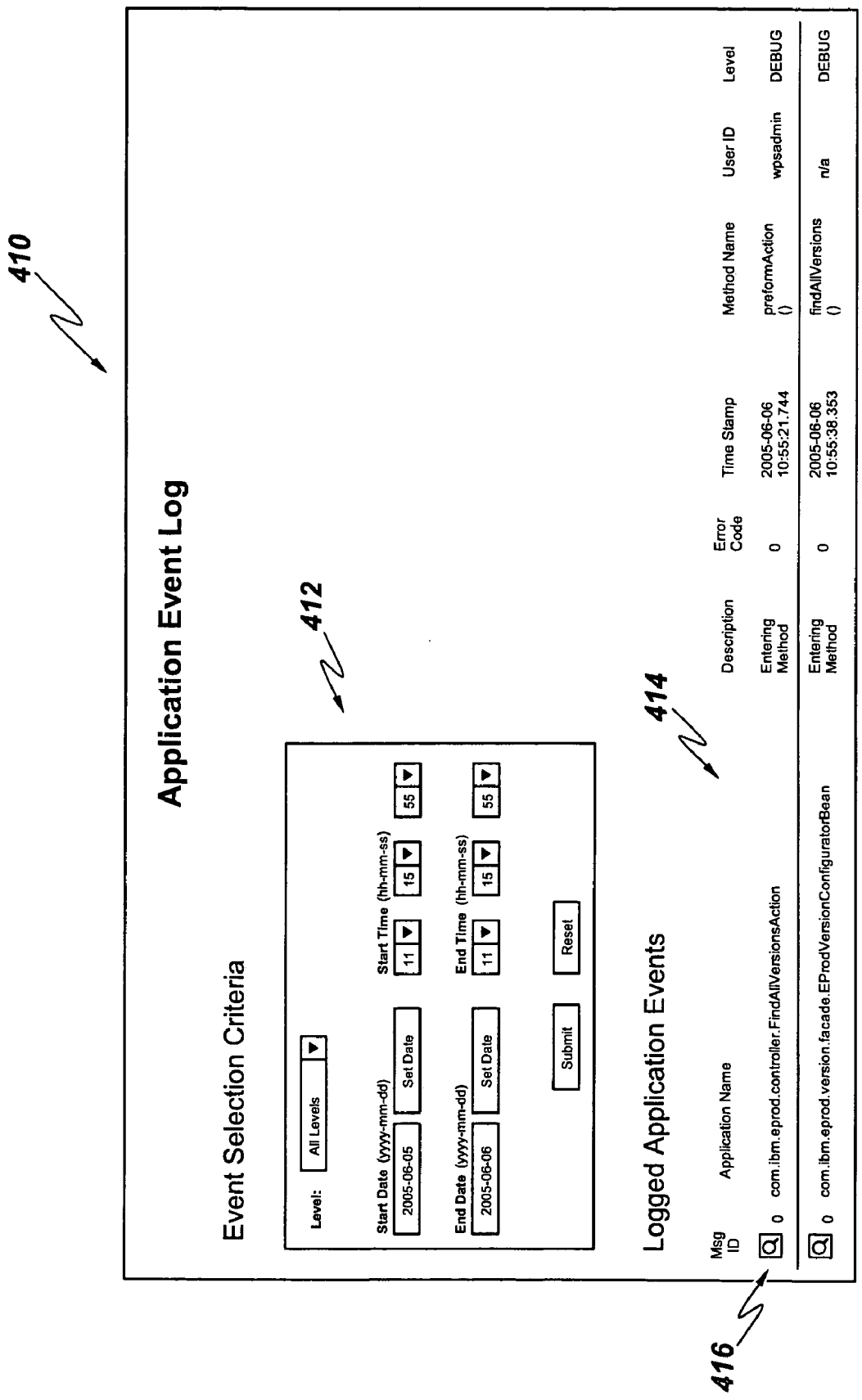

With reference to FIG. 14, an exemplary application event log portlet 410 as may be provided by the log retrieval application 350 and the log portlet application 352 is shown therein. The user may use the portlet 410 to retrieve logged data from the tables 342, 344, 346. In the portlet 410, an authorized user selects a specified time range and an "error level" using query fields 412. The selectable "error levels" may include Information, Warning, Error, and Debug. All "application event logged" messages with a time stamp in this time range and an error level no smaller than the one specified will be displayed in a listing 414. The user may click on a magnifying glass icon 416 beside a listed message of interest, responsive to which the log retrieval application 350 and the log portlet application 352 will generate another portlet or pop-up window listing further data such as contextual information correlated to the message.

The system 10 also provides a GUI to allow the user to manually recover failed events. The user can query the table 342 of logged events based on criteria such as start time, end time and severity of failure. For each event in failure, the user will have the option to clear or resubmit the event. A resubmitted event is referred to herein as a "child event" and the corresponding failed event is referred to as its "parent event". The child event may be a restart or a resumption of the failed parent event. The parent event may itself be a resubmitted event (i.e., the subject event may be both a child event to a preceding parent event and a parent event to a subsequent child event).

Referring to the logical architecture depicted in FIG. 13, for each failed parent event that is to be resubmitted as a child event for execution, the recovery application 250 generates a child event, encapsulates the child event in a Web Service, and transforms the event message into a JMS message (which may be referred to herein as an "event recovery message") to be consumed by the event interface application 230. The event interface application 230 in turn calls the BPEL run-time engine 222 (FIG. 10). Based on the user's input, the recovery application 250 will indicate in the child event Web Service message whether the parent event is to be "restarted" (this means invoking all the services of the BPEL process associated with the failed parent event) or, alternatively, "resumed" (this means invoking the service that failed and all subsequent services of the BPEL process associated with the failed parent event). For failed events that are to be cleared, the recovery application 250 changes the status of the failed event to "cleared" in the event log table 342.

In the case of a restart child event, the recovery application 250 will build and send an event recovery message as discussed above. A restarted event means to re-execute the process triggered by the parent event from the first step in the process. In this case, the recovery application 250 will gather the original or parent event input message logged by the event interface application 230 in the event log table 342, and resend that input message back to the event interface application 230. However, before the child event is sent, the recovery application 250 allows the user to change message values in the original input message through a screen or set of screens. The recovery application 250 will construct a JMS map message to pass to the event interface application 230. The recovery application 250 will populate the message with the original input message data as logged from the event interface application 230 or the original message with changed data values provided by the user. The event interface application 230 will also add two new key fields of the event recovery message. The first is the restart step number ("RestartStepNumber") and the second is the EIN or eventid of the original failed event ("ParentEventId"), which is generated by the event interface application 230 as discussed above. This will be used in subsequent event logs to correlate the parent and child events together.

The restart request is handled as follows. The event interface application 230 receives the child event request as any other event request and starts the BPEL process. The "RestartStepNumber" and "ParentEventId" of the input message are passed on to the BPEL process by the event interface application 230. The "RestartStepNumber" in the case of a restart will be "0", indicating that the process is to be restarted from the beginning. The BPEL file has Java snippets before and after each Web Service or action step. The BPEL file checks the "RestartStepNumber" parameter of the original message. If the action number is greater than the "RestartStepNumber", then the action step is executed, otherwise the action step is skipped. In this case the value is "0" and all steps will be re-executed with the original input data.

In the case of a resume child event, the recovery application 250 will build and send an event recovery message. If the recovery application 250 does not restart the process at the first step (this would be to restart the event), then the recovery application 250 must capture the output message data for the action steps that it wants to skip over. This output data (from the action steps of the executable business process invoked by the parent event that previously ran successfully) is possible input for the action step that failed and any step(s) that did not execute after the failed step. The recovery application 250 provides GUI screens that allow the user to view the action steps that ran successfully and their available output messages. The screen(s) allow the user to change data values from the original input message (logged by the event interface application 230) or any successfully run step's output message. The recovery application 250 will gather these data values and send them back to the event interface application 230 in a resume child event message. In summary, the recovery application 250 allows the user to change the original or parent event input data and/or output data from the failed process and resubmit that event with that changed data as a resume child event. The recovery application 250 will construct a JMS map message to pass to the event interface application 230. It will populate the child event message with the original input message data as logged from the event interface application 230 with changed data values provided by the user. The event interface application 230 will also add two new key fields to the event recovery message. The first is the restart step number ("RestartStepNumber") and the second is the HashMap serialized as a string ("RecoverStepNumber") holding the data captured, and described, above. Also, the EIN or eventid of the original failed event ("ParentEventId") will be added to the child event message. This will be used in subsequent event logs to correlate the parent and child events together.

The resume request is handled as follows. The event interface application 230 will receive the resume child request as any other request and start the BPEL process (i.e., invoke the BPEL file). The "RestartStepNumber" and "RecoverRestartData" fields of the input message are passed on to the BPEL process by the event interface application 230. The BPEL file checks the "RecoverRestartData" field as one of the first steps in the BPEL process and deserializes the object into the HashMap that was constructed by the recovery application 250. The BPEL file has Java snippets before and after each action step. The BPEL file checks the "RestartStepNumber" parameter of the original message. If the action number is greater than the "RestartStepNumber", then the action step is executed. Otherwise, the action step is skipped but the Java snippet will populate the output message from the reconstructed HashMap.

With reference to FIG. 15, an exemplary recovery event log portlet 420 for allowing the user to clear, restart, and resume events as discussed above is shown therein. The recovery event log portlet 420 may be provided by the log retrieval application 350 and the log portlet application 352. The user may use the portlet 420 to retrieve logged data from the tables 342, 344, 346, to clear errors, to modify failed events (i.e., configure child events), and to resubmit failed events (i.e., child events for restart or resumption).

In the portlet 420, an authorized user selects a specified time range and a "state" using query fields 422 or the Event ID using the field 423. The selectable "states" may indicate a relative severity of failure and may include the following: In Progress; Success; Error; Cleared; and Restarted. All "logged events" messages with a time stamp in the specified time range and a state level no smaller than the one specified are displayed in a listing 424. The listing 434 includes various information as shown including the state of the event (i.e., the state of the triggered process). As shown, the last event listed is easily identified as an "error" state or failed event. The parent event ID is also indicated. "Null" indicates that the event is an original event (e.g., from the plant floor) and therefore there exists no parent event. If an event has been resubmitted, the "Parent Event ID" column will list the failed parent event to the executed (or attempted) child event.

For each event having an "error" state, the portlet 420 includes a trash can icon 426. The user can clear the "error" state by clicking the icon 426, whereupon the state will be listed as "cleared." The portlet 420 also includes an envelope icon 427 for each event having an "error" state, as discussed below. The portlet 420 includes a right arrow icon 425 beside each listed event. The user may click on the right arrow icon 425 beside a listed event of interest, responsive to which the log retrieval application 350 and the log portlet application 352 will generate an action log portlet 430 as shown in FIG. 16.

Figure 16:
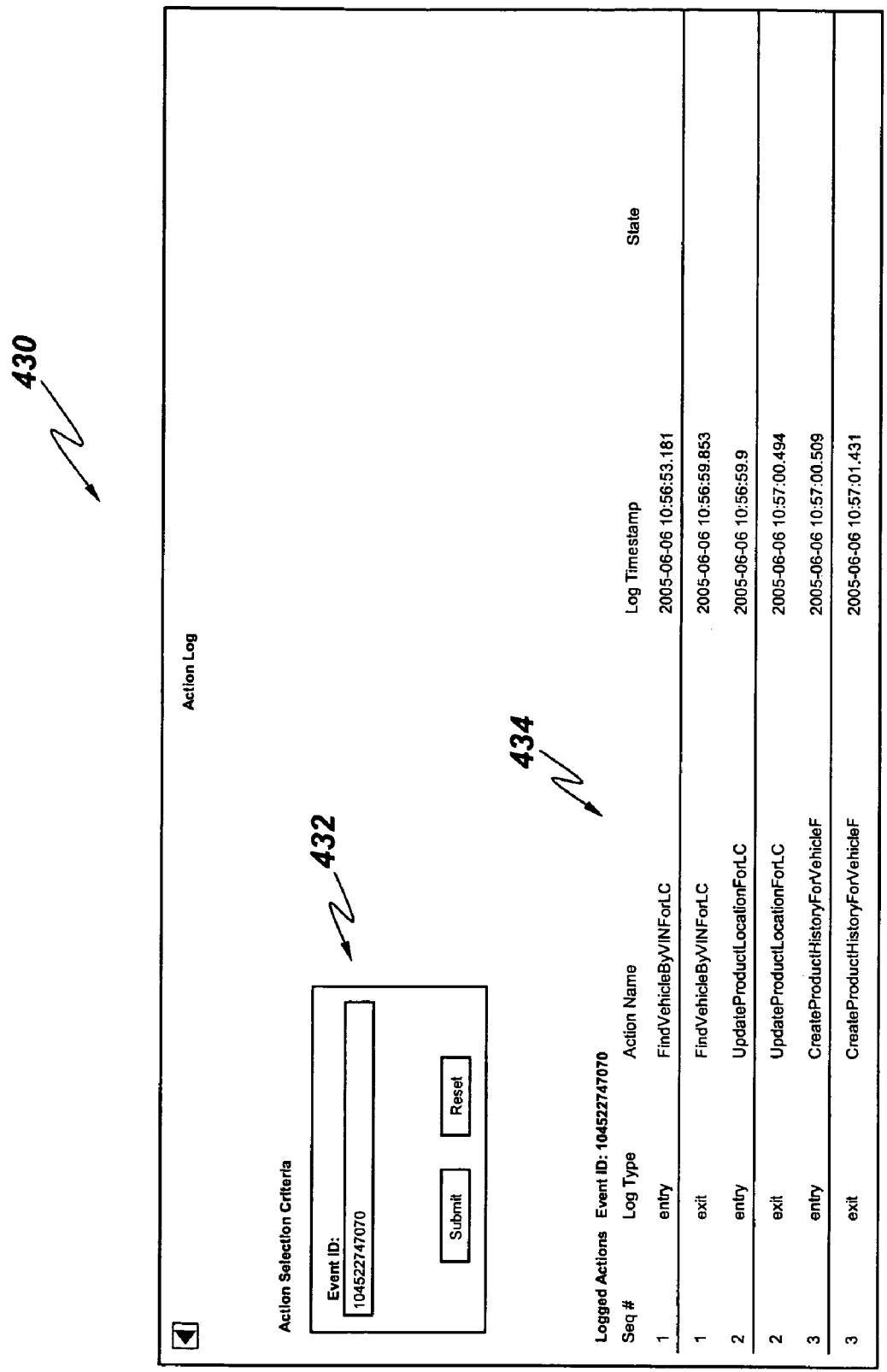

Referring to FIG. 16, a listing 434 of the actions or services (which may include Web Services) corresponding to the selected event is provided in the action log portlet 430. For each action, the listing 434 indicates the sequence number (i.e., the number of the action in the sequence of the executable business process triggered by the selected parent event) and whether the action has been logged for "entry" and "exit." When an action is indicated as logged for "exit", the user may readily determine that it is a completed action. When an action is indicated as logged for "entry" but not "exit," the user may readily determine that the process triggered by the event failed on this action. The user may retrieve the action log information for a further event by returning to the portlet 420 or using a field 432 in the portlet 430.

Figure 17:
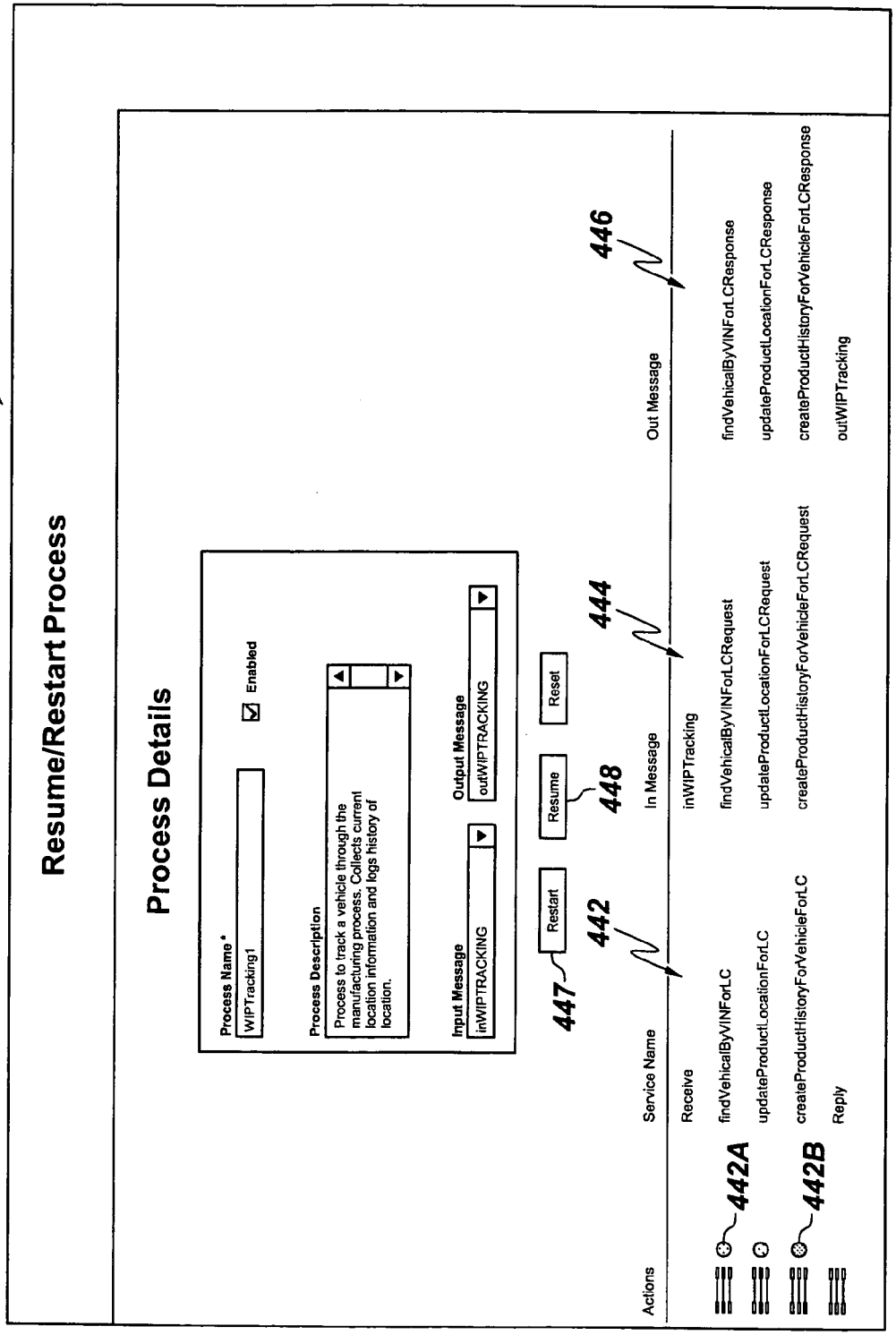
Figure 18:
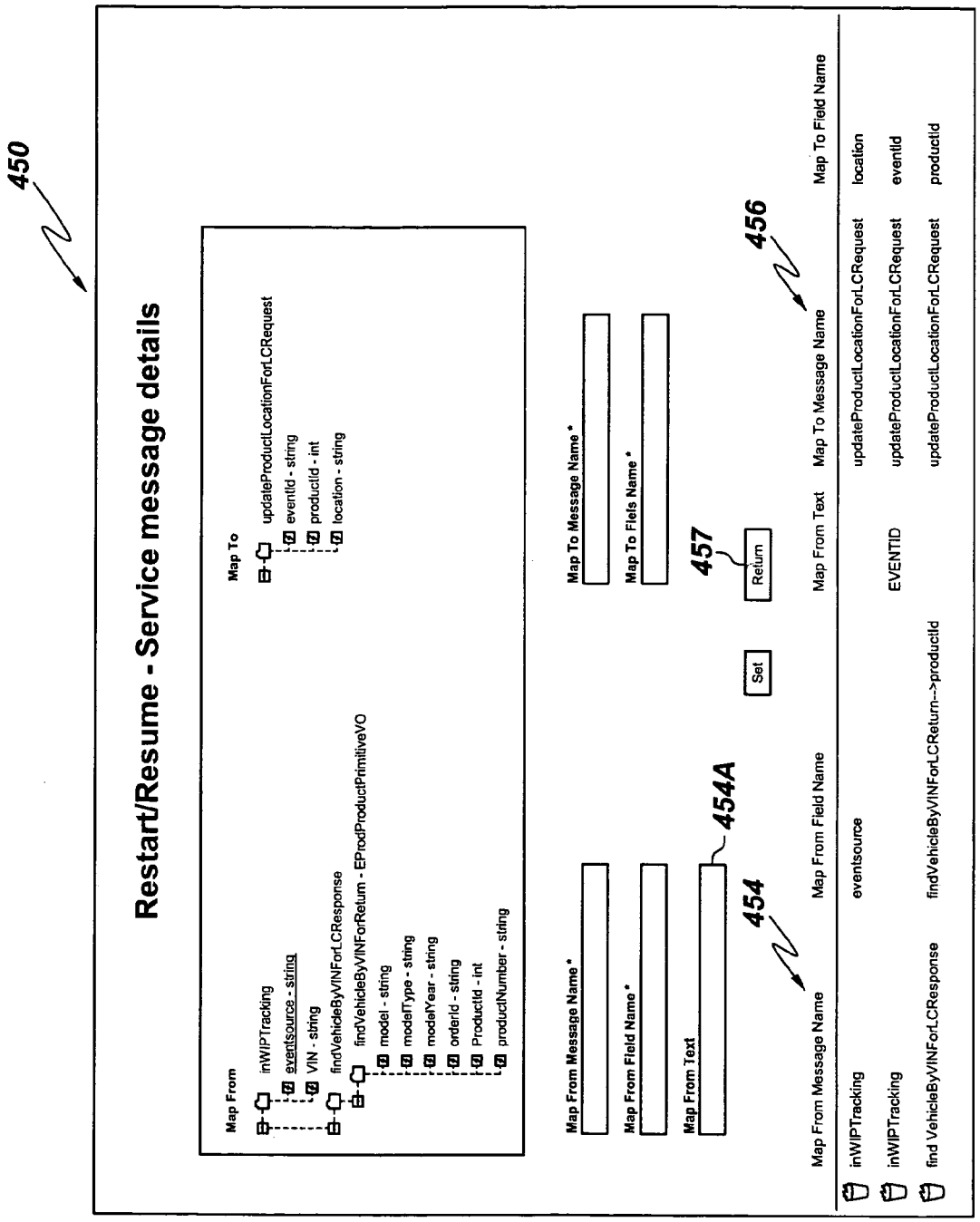
Figure 19:
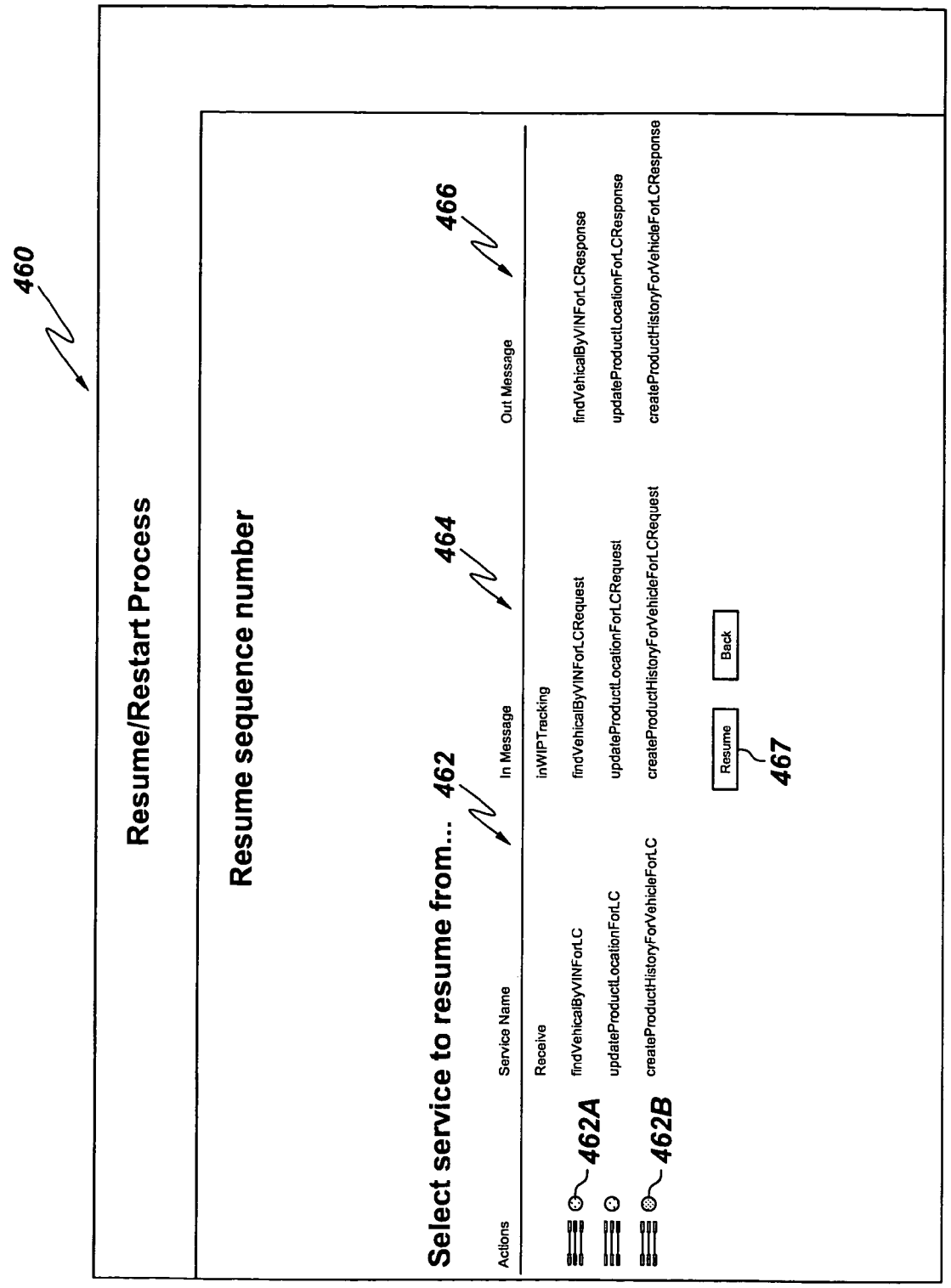

Referring again to FIG. 15, in order to reconfigure or modify the failed event, the user clicks on the associated envelope icon 427. A process details portlet 440 as shown in FIG. 17 is then displayed which includes information corresponding to the failed event. A listing 442 of the services that comprise the process associated with the event is provided. Successfully completed services are indicated by icons 442A of a first type (e.g., colored green) and the failed service is indicated by an icon 442B of a second type (e.g., colored red). Additionally, for each service, an input message 444 and an output message 446 are displayed. As shown, no input message is indicated for the service or action step that was not initiated due to failure of a preceding step.

If desired, the user can change the data values for the input and output messages for any service/action indicated as failed or not yet initiated by clicking on a selected service in the listing 442. A messages detail service portlet 450 (FIG. 18) is generated and displays information corresponding to the selected service. The portlet 450 includes a listing 454 of the service's available input messages on the left and a listing 456 of the service's input message on the right. The "Map From" messages 454 are the original process input message provided by the parent event and the output messages from the services that successfully completed in the failed parent process. The user may change the input data values by typing a new value in the static text box 454A on the left for the originally mapped values. The new values will be reflected in the listings 454, 456. This step may be repeated as necessary to designate all the necessary data values for the input message to the service. The user may then click a "Return" button 457 to return to the portlet 440 (FIG. 17).

The foregoing service data value change procedure may be executed for each service as desired. Whether or not any services have changed data values, the user can click the "Restart" button 447 in the portlet 440 (FIG. 17) to submit the child event configuration to the recovery application 250. The child event configuration is processed and forwarded by the recovery application 250 as discussed above.

Rather than click the "Restart" button 447 in the portlet 440 (FIG. 17), the user may click the "Resume" button 448. A resume sequence number portlet 460 (FIG. 19) will then be generated. A listing 462 of the services that comprise the process associated with the event is provided. The services that were successfully completed responsive to the parent event are indicated by icons 462A of a first type (e.g., colored green) and the failed service is indicated by an icon 462B of a second type (e.g., colored red). The in message 464 and the out message 466 for each service are also displayed. The user may click on the service in the listing 462 that the user desires to be the first step executed upon initiation of the process that will be triggered by the child event. Following this selection, the user clicks a "Resume" button 467 to submit the child event configuration to the recovery application 250. The child event configuration is processed and forwarded by the recovery application 250 as discussed above.

The various applications, databases, etc. as discussed herein may be included on one or more servers. According to some embodiments, the event interface application 230 resides on a back end server while the recovery application 250, the log retrieval application 350, and the log portlet application 352 reside on a front end server. Two or more event interface applications 230 may be provide on respective back end servers and serviced by the same front end server and recovery application 250, log retrieval application 350, and log portlet application 352.

An exemplary data model is set forth below as Table 1. Table 1 lists all of the attribute definitions used by the line configuration services, which include version configuration services, tree configuration services, service import configuration services, message configuration services, process configuration services, and process point configuration services.

TABLE 1

Line Configuration Data Model

| Attribute Name | Attribute Type | Description |
|---|---|---|
| Tree Configurator sub-data model | | |
| NodeId | INTEGER | Node identification number |
| NodeName | VARCHAR(32) | Node name |
| LCName | VARCHAR(100) | Line configuration version name |
| LCVersion | FLOAT(0) | Line configuration version number |
| ParentNodeId | INTEGER | Parent node identification number |
| Description | VARCHAR(256) | Description of node |
| Event process map sub-data model | | |
| NodeId | INTEGER | Node identification number |
| ProcessId | INTEGER | Process identification number |
| ProcessPoint | VARCHAR(64) | Process point name |
| LCName | VARCHAR(100) | Line configuration version name |
| LCVersion | FLOAT(0) | Line configuration version number |
| Enabled | SAMLLINT | Status to indicate process is enabled at process point |
| StartDateTime | TIMESTAMP | Start date and time for scheduled process |
| EndDateTime | TIMESTAMP | End date and time for scheduled process |
| Period | INTEGER | Period to repeat the trigger of the process automatically |
| PeriodUnits | VARCHAR(32) | Units of the period interval (hour, day, week, etc) |
| Line configuration version sub-data model | | |
| LCName | VARCHAR(100) | Line configuration version name |
| LCVersion | FLOAT(0) | Line configuration version number |

TABLE 1-continued

Line Configuration Data Model

| Attribute Name | Attribute Type | Description |
|---|---|---|
| LCDescription | VARCHAR(256) | Line configuration description |
| Service category sub-data model | | |
| NodeId | INTEGER | Service category node ID |
| LCName | VARCHAR(100) | Line configuration version name |
| LCVersion | FLOAT(0) | Line configuration version number |
| NodeName | VARCHAR(32) | Service category node name |
| ParentNodeId | INTEGER | Service category parent node ID |
| Description | VARCHAR(256) | Description of the service category node |
| Service definition sub-data model | | |
| OriginalUrl | VARCHAR(256) | URL of the service to be imported |
| NodeId | INTEGER | Service node ID |
| LCName | VARCHAR(100) | Line configuration version name |
| LCVersion | FLOAT(0) | Line configuration version number |
| ServiceName | VARCHAR(32) | Service node name |
| Description | VARCHAR(256) | Description of the service node |
| ImportTimestamp | TIMESTAMP | Date and time of the service import |
| Process definition sub-data model | | |
| ProcessId | INTEGER | Process ID |
| Name | VARCHAR(32) | Process name |
| LCName | VARCHAR(100) | Line configuration version name |
| LCVersion | FLOAT(0) | Line configuration version number |
| Enabled | SMALLINT | Enabled or disabled status of the process |
| Deployable | SMALLINT | Deployed or undeployed status of the process |
| Description | VARCHAR(256) | Description of the process |
| ProcessTemplate | VARCHAR(64) | |
| Event message sub-data model | | |
| MsgId | INTEGER | Message ID |
| MsgType | VARCHAR(8) | Message type (input or output) |
| ProcessId | INTEGER | |
| Message definition sub-data model | | |
| MsgId | INTEGER | |
| MsgName | VARCHAR(100) | |
| MsgNameSpace | VARCHAR(256) | |
| LCName | VARCHAR(32) | |
| LCVersion | FLOAT(0) | |
| Field definition sub-data model | | |
| MsgId | INTEGER | |
| FieldName | VARCHAR(100) | |
| FieldType | VARCHAR(100) | |
| FieldNameSpace | VARCHAR(256) | |
| Mapping defaults | | |
| NodeId | INTEGER | |
| ProcessId | INTEGER | |
| MsgId | INTEGER | |
| FieldName | VARCHAR(100) | |
| FieldValue | VARCHAR(256) | |
| UseAlways | VARCHAR(1) | |

TABLE 1-continued

Line Configuration Data Model

| Attribute Name | Attribute Type | Description |
| --- | --- | --- |
| Service conditional execution sub-data model | | |
| ProcessId | INTEGER | |
| ActivityId | INTEGER | |
| ParentId | INTEGER | |
| PositionInParent | INTEGER | |
| LeftMsgId | INTEGER | |
| LeftFieldName | VARCHAR(100) | |
| RightMsgId | INTEGER | |
| RightFieldName | VARCHAR(100) | |
| RightStaticText | VARCHAR(256) | |

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

We claim:

1. A computer-implemented method for implementing a production process, the method comprising:
    logging event data corresponding to a parent event that has triggered an executable business process that has failed;
    displaying the event data to a user; and
    responsive to input from the user:
        generating a child event based on the event data; and
        submitting the child event to a process engine to initiate re-execution of the executable business process in accordance with the child event.

2. The method of claim 1 wherein the child event has the same configuration as the parent event.

3. The method of claim 1 comprising:
    receiving modification input from the user; and
    modifying the configuration of the child event as compared to the parent event in accordance with the modification input.

4. The method of claim 3 wherein:
    the executable business process comprises a plurality of actions;
    modifying the configuration of the child event as compared to the parent event in accordance with the modification input comprises setting a resumption action selected from the plurality of actions; and
    the method further comprises re-executing the executable business process responsive to submission of the child event to the process engine such that the executable business process starts with the resumption action.

5. The method of claim 3 wherein modifying the configuration of the child event as compared to the parent event in accordance with the modification input comprises modifying a process input message of the executable business process and/or an action input message of an action of the executable business process.

6. The method of claim 3 wherein receiving the modification input from the user comprises receiving the modification input from the user via a graphical user interface.

7. The method of claim 1 comprising generating an executable business process file comprising computer readable code and/or attributes to enable re-execution of the failed executable business process in accordance with the input from the user responsive to the submission of the child event to the process engine.

8. The method of claim 1 wherein submitting the child event to the process engine to initiate re-execution of the executable business process in accordance with the child event comprises submitting the child event to an event interface application that processed the parent event.

9. The method of claim 1 comprising displaying to the user at least one of executed events, statuses of processes triggered by executed events, executed actions, outputs of executed actions, input messages to actions, an input message to the executable business process, and/or a status of the executable business process.

10. The method of claim 1 wherein the executable business process is an executable Business Process Execution Language (BPEL) process.

11. The method of claim 1 wherein the executable business process comprises at least one Web Service.

12. A computer program product for implementing a production process, the computer program product comprising:
    a computer usable medium having computer usable program code embodied therein, the computer usable program code comprising:
    computer usable program code configured to log event data conesponding to a parent event that has triggered an executable business process that has failed;
    computer usable program code configured to display the event data to a user; and
    computer usable program code configured, in response to input from the user, to:
        generate a child event based on the event data; and
        submit the child event to a process engine to initiate re-execution of the executable business process in accordance with the child event.

13. The computer program product of claim 12 comprising:
    computer usable program code configured to receive modification input from the user; and
    computer usable program code configured to modify the configuration of the child event as compared to the parent event in accordance with the modification input.

14. The computer program product of claim 12 wherein:
    the executable business process comprises a plurality of actions;
    the computer usable program code configured to modify the configuration of the child event as compared to the parent event in accordance with the modification input comprises computer usable program code configured to set a resumption action selected from the plurality of actions; and
    the computer program product further comprises computer usable program code configured to re-execute the executable business process responsive to submission of the child event to the process engine such that the executable business process starts with the resumption action.

15. The computer program product of claim 13 wherein the computer usable program code configured to modify the configuration of the child event as compared to the parent event in accordance with the modification input comprises computer usable program code configured to modify a process input message of the executable business process and/or an action input message of an action of the executable business process.

16. The computer program product of claim 13 wherein the computer usable program code configured to receive modification input from the user comprises computer usable program code configured to receive the modification input from the user via a graphical user interface.

17. The computer program product of claim 12 comprising computer usable program code configured to generate an executable business process file comprising computer usable code and/or attributes to enable re-execution of the failed executable business process in accordance with the input from the user responsive to the submission of the child event to the process engine.

18. The computer program product of claim 12 wherein the computer usable program code configured to submit the child event to the process engine to initiate re-execution of the executable business process in accordance with the child event comprises computer usable program code configured to submit the child event to an event interface application that processed the parent event.

19. The computer program product of claim 12 comprising computer usable program code configured to display to the user at least one of executed events, statuses of processes triggered by executed events, executed actions, outputs of executed actions, input messages to actions, an input message to the executable business process, and/or a status of the executable business process.

20. A system for implementing a production process, the system comprising at least one application server configured to:
- log event data corresponding to a parent event that has triggered an executable business process that has failed;
- display the event data to a user; and
- responsive to input from the user:
  - generate a child event based on the event data; and
  - submit the child event to a process engine to initiate re-execution of the executable business process in accordance with the child event.

* * * * *